(12) United States Patent
Koyanagi et al.

(10) Patent No.: US 11,785,155 B2
(45) Date of Patent: Oct. 10, 2023

(54) IMAGE READING APPARATUS

(71) Applicant: SEIKO EPSON CORPORATION, Tokyo (JP)

(72) Inventors: Noriyuki Koyanagi, Kitakyushu (JP); Keiichiro Fukumasu, Kitakyushu (JP); Ryoichi Shuto, Kitakyushu (JP); Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/935,601

(22) Filed: Sep. 27, 2022

(65) Prior Publication Data
US 2023/0102828 A1    Mar. 30, 2023

(30) Foreign Application Priority Data
Sep. 30, 2021  (JP) ................. 2021-160429

(51) Int. Cl.
*H04N 1/00* (2006.01)
(52) U.S. Cl.
CPC ..... *H04N 1/00602* (2013.01); *H04N 1/00559* (2013.01); *H04N 1/00615* (2013.01); *H04N 2201/0081* (2013.01)
(58) Field of Classification Search
CPC .......... H04N 1/00522; H04N 1/00535; H04N 1/00559; H04N 1/0562; H04N 1/00602; H04N 1/00612; H04N 1/00615; H04N 2201/0081; H04N 1/12; H04N 1/1135; H04N 2201/0082; H04N 1/00525; H04N 1/053; H04N 2201/04713; H04N 2201/04732; H04N 2201/04744; H04N 1/00572; H04N 1/00578; H04N 1/00588; H04N 1/00928; H04N 1/0058; H04N 1/00586; H04N 1/00591; H04N 1/00596; H04N 1/4078; H04N 2201/0091; H04N 1/00567; H04N 1/00594; H04N 1/00604; H04N 1/0061; H04N 1/00795; H04N 1/00827; H04N 1/00915; H04N 1/0464; H04N 1/1215; H04N 1/193; H04N 1/195; (Continued)

(56) References Cited

U.S. PATENT DOCUMENTS 6,640,082 B2 * 10/2003 Mitomi ............. H04N 1/00588
                                                   399/374
7,455,285 B2 * 11/2008 Goh ...................... B41J 13/106
                                                   399/373

(Continued)

FOREIGN PATENT DOCUMENTS

JP    2012-246098 A    12/2012

*Primary Examiner* — Negussie Worku
(74) *Attorney, Agent, or Firm* — WORKMAN NYDEGGER

(57) ABSTRACT

An apparatus body of an image reading apparatus is turnably provided to a body supporting portion. The apparatus body is turned so as to be switchable between a first posture and a second posture that forms an angle between a reading transportation path and a mounting surface being smaller than the corresponding angle formed in the first posture. A transportation path switching unit couples the reading transportation path to a reverse transportation path when the apparatus body takes the first posture, and couples the reading transportation path to a non-reverse transportation path when the apparatus body takes the second posture.

13 Claims, 20 Drawing Sheets

(58) Field of Classification Search
CPC ............... H04N 1/32561; H04N 1/40; H04N 2201/0434; H04N 1/00002; H04N 1/00005; H04N 1/00018; H04N 1/0005; H04N 1/00082; H04N 1/00092; H04N 1/00347; H04N 1/00413; H04N 1/00432; H04N 1/00477; H04N 1/0048; H04N 1/00482; H04N 1/00488; H04N 1/00551; H04N 1/00657; H04N 1/2032; H04N 2201/0084; H04N 2201/0436; G03G 15/0818; G03G 2215/0177; G03G 15/0812; G03G 15/556; G03G 15/5058; G03G 2215/0844; G03G 2215/00059; G03G 2221/163; G03G 15/0173; G03G 15/5033; G03G 2215/00029; G03G 2215/2032; G03G 15/0131; G03G 15/161; G03G 15/2064; G03G 15/0121; G03G 15/2053; G03G 15/206; G03G 2215/2035; G03G 2215/2041; G03G 2221/1654; G03G 15/043; G03G 15/0813; G03G 15/553; G03G 15/6552; G03G 15/6573; G03G 21/1647; G03G 2215/00586; G03G 2215/0822; G03G 15/00; G03G 15/0266; G03G 15/0817; G03G 15/0849; G03G 15/1615; G03G 15/5012; G03G 15/5041; G03G 15/55; G03G 15/602; G03G 15/6529; G03G 15/655; G03G 15/6582; G03G 2215/00067; G03G 2215/0132; G03G 2215/0154; G03G 2215/0863; G03G 2221/1823; G03G 15/04036; G03G 15/0435; G03G 15/0856; G03G 15/0862; G03G 15/0863; G03G 15/0896; G03G 15/2046; G03G 15/326; G03G 15/5004; G03G 15/5008; G03G 15/5029; G03G 15/6541; G03G 15/6591; G03G 15/70; G03G 21/00; G03G 21/1671; G03G 21/1676; G03G 21/206; G03G 2215/00042; G03G 2215/00502; G03G 2215/00607; G03G 2215/00675; G03G 2215/00679; G03G 2215/00734; G03G 2215/00742; G03G 2215/00827; G03G 2215/00831; G03G 2215/0164; G03G 2215/0695; G03G 2221/166; G03G 2221/1675; G03G 15/08; G03G 15/0806; G03G 15/0808; G03G 15/167; G03G 15/1695; G03G 15/20; G03G 15/2003; G03G 15/2017; G03G 15/2042; G03G 15/234; G03G 15/5062; G03G 15/60; G03G 15/757; G03G 21/0005; G03G 21/1685; G03G 2215/00126; G03G 2215/00185; G03G 2215/00282; G03G 2215/00371; G03G 2215/00421; G03G 2215/2083; G03G 2221/1606; G03G 2221/1657; G03G 9/0819; G03G 9/0821; G03G 9/087; G03G 9/08755; G03G 9/08764; G03G 9/08795; G03G 9/08797; B65H 2301/33312; B65H 85/00; B65H 29/58; B65H 5/062; B65H 2404/632; B65H 29/125; B65H 2220/09; B65H 2301/1321; B65H 2301/5122; B65H 2402/10; B65H 2402/31; B65H 2402/441; B65H 2402/60; B65H 2403/422; B65H 2403/481; B65H 2403/541; B65H 2403/73; B65H 2403/942; B65H 2404/143; B65H 2404/611; B65H 2404/6111; B65H 2555/13; B65H 2601/11; B65H 2801/06; B65H 2801/39; B65H 29/14; B65H 29/70; B65H 5/36; B65H 7/02; B65H 9/008; B65H 1/12; B65H 1/266; B65H 2301/332; B65H 2301/4213; B65H 2301/42194; B65H 2301/448; B65H 2404/142; B65H 2405/11162; B65H 2405/1117; B65H 2405/1134; B65H 2405/121; B65H 2405/31; B65H 2405/324; B65H 2405/3322; B65H 2407/21; B65H 2511/212; B65H 2511/22; B65H 2511/417; B65H 2515/31; B65H 2515/34; B65H 2601/523; B65H 2701/18262; B65H 2801/12; B65H 2801/27; B65H 3/0684; B65H 33/08; B65H 39/10; B65H 5/38; G02B 26/105; G02B 26/0833; G02B 26/0841; G02B 26/085; G02B 7/1821; B41M 5/363; B65G 35/066; B65G 2207/30; B65G 35/063; B65G 35/00; B65G 67/02
USPC .......................................... 358/474
See application file for complete search history.

(56) References Cited

U.S. PATENT DOCUMENTS

| | | | |
|---|---|---|---|
| 2007/0081065 A1* | 4/2007 | Ootsuka | H04N 1/00795 347/104 |
| 2010/0245948 A1* | 9/2010 | Takeuchi | H04N 1/00734 358/498 |
| 2012/0081763 A1* | 4/2012 | Goto | H04N 1/00583 358/498 |
| 2017/0111535 A1* | 4/2017 | Morimoto | H04N 1/00891 |
| 2021/0120135 A1* | 4/2021 | Mokuo | H04N 1/00535 |

\* cited by examiner

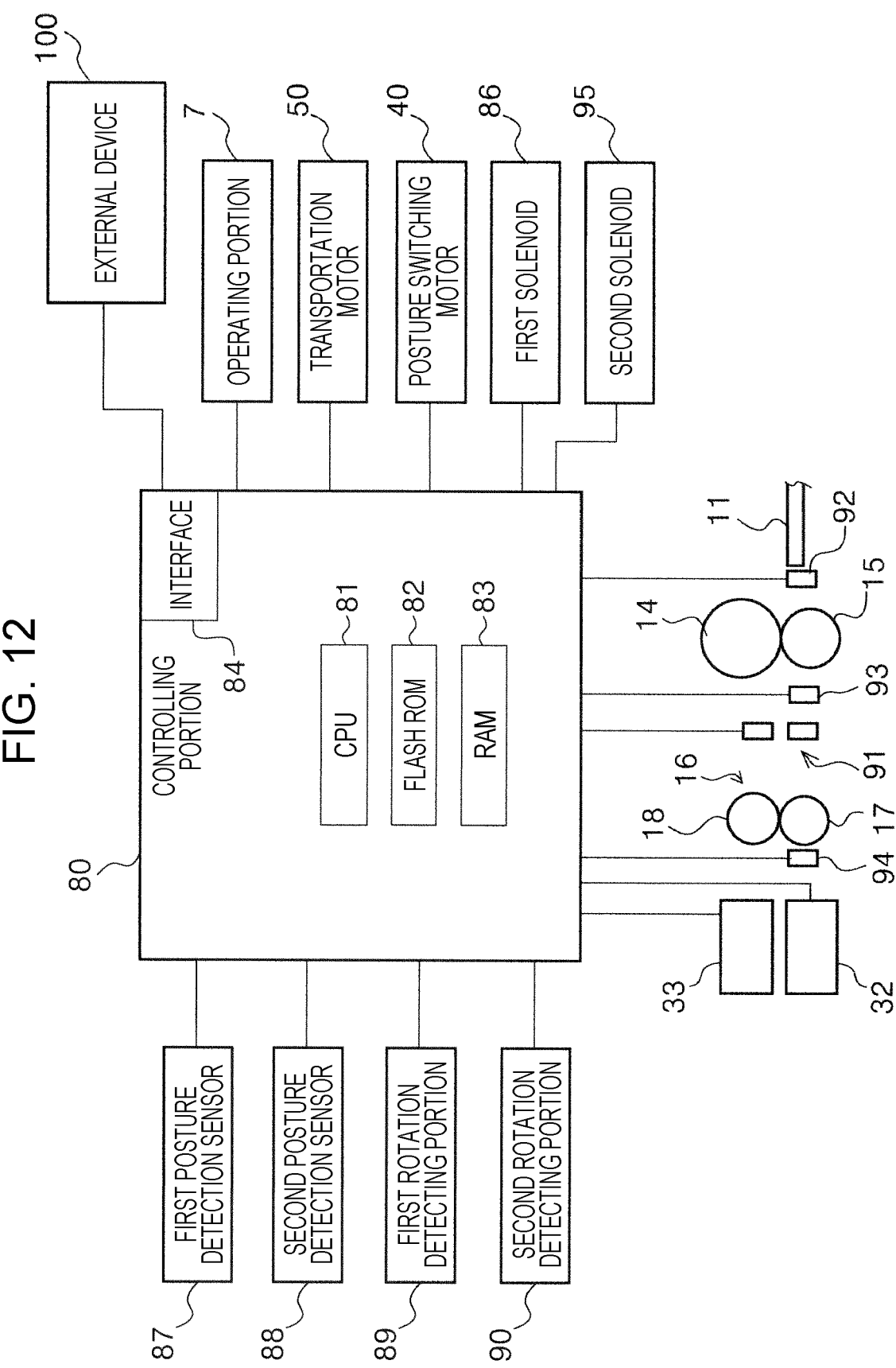

IMAGE READING APPARATUS

The present application is based on, and claims priority from JP Application Serial Number 2021-160429, filed Sep. 30, 2021, the disclosure of which is hereby incorporated by reference herein in its entirety.

BACKGROUND

1. Technical Field

The present disclosure relates to an image reading apparatus that reads an image on a medium.

2. Related Art

There is a sheet feed-type scanner that represents an example of an image reading apparatus. When a scanner is simply mentioned in the following description, that scanner is assumed to represent such a sheet feed-type scanner. As described in JP-A-2012-246098, a scanner may adopt a configuration to significantly incline a transportation path for transporting a sheet relative to a horizontal plane, and further to cause the sheet to make U-turn so as to be discharged obliquely upward in order to reduce a footprint. The scanner described in JP-A-2012-246098 can switch the transportation path from a U-turn path to a straight path by partially opening the U-shaped transportation path. Switching the transportation path from the U-turn path to the straight path makes it possible to favorably discharge a sheet that is thick and less flexible, for example.

The scanner according to JP-A-2012-246098 can switch the transportation path from the U-turn path to the straight path. However, the straight path is significantly inclined relative to the horizontal plane and a space on a lower side of the U-shaped transportation path is small. As a consequence, when the straight path is used, rigidity of a dischargeable sheet is higher than that when using the U-turn path. Nonetheless, there is still a problem for appropriately discharging an original having high rigidity and a large size.

SUMMARY

An image reading apparatus of the present disclosure includes a body supporting portion mounted on a mounting surface of the apparatus, and an apparatus body supported and configured to turn by the body supporting portion. Here, the apparatus body includes a reading transportation path opposed to a reading unit that reads an original, a reverse transportation path located downstream of the reading transportation path, and used when the original subjected to reading is reversed upward and discharged, a non-reverse transportation path located downstream of the reading transportation path, and configured to discharge the original subjected to reading without reversing the original, and a transportation path switching unit located downstream of the reading transportation path and configured to switch an original transportation path used to transport the original to any of the reverse transportation path and the non-reverse transportation path. The apparatus body is configured to be turned relative to the body supporting portion so as to switch between a first posture and a second posture, the second posture forming an angle between the reading transportation path and the mounting surface being smaller than an angle between the reading transportation path and the mounting surface formed in the first posture. The transportation path switching unit switches the original transportation path to the reverse transportation path when the apparatus body is switched to the first posture, and switches the original transportation path to the non-reverse transportation path when the apparatus body is switched to the second posture.

BRIEF DESCRIPTION OF THE DRAWINGS

FIG. 12 is a block diagram showing a control system of the scanner.

DESCRIPTION OF EXEMPLARY EMBODIMENTS

Figure 1:
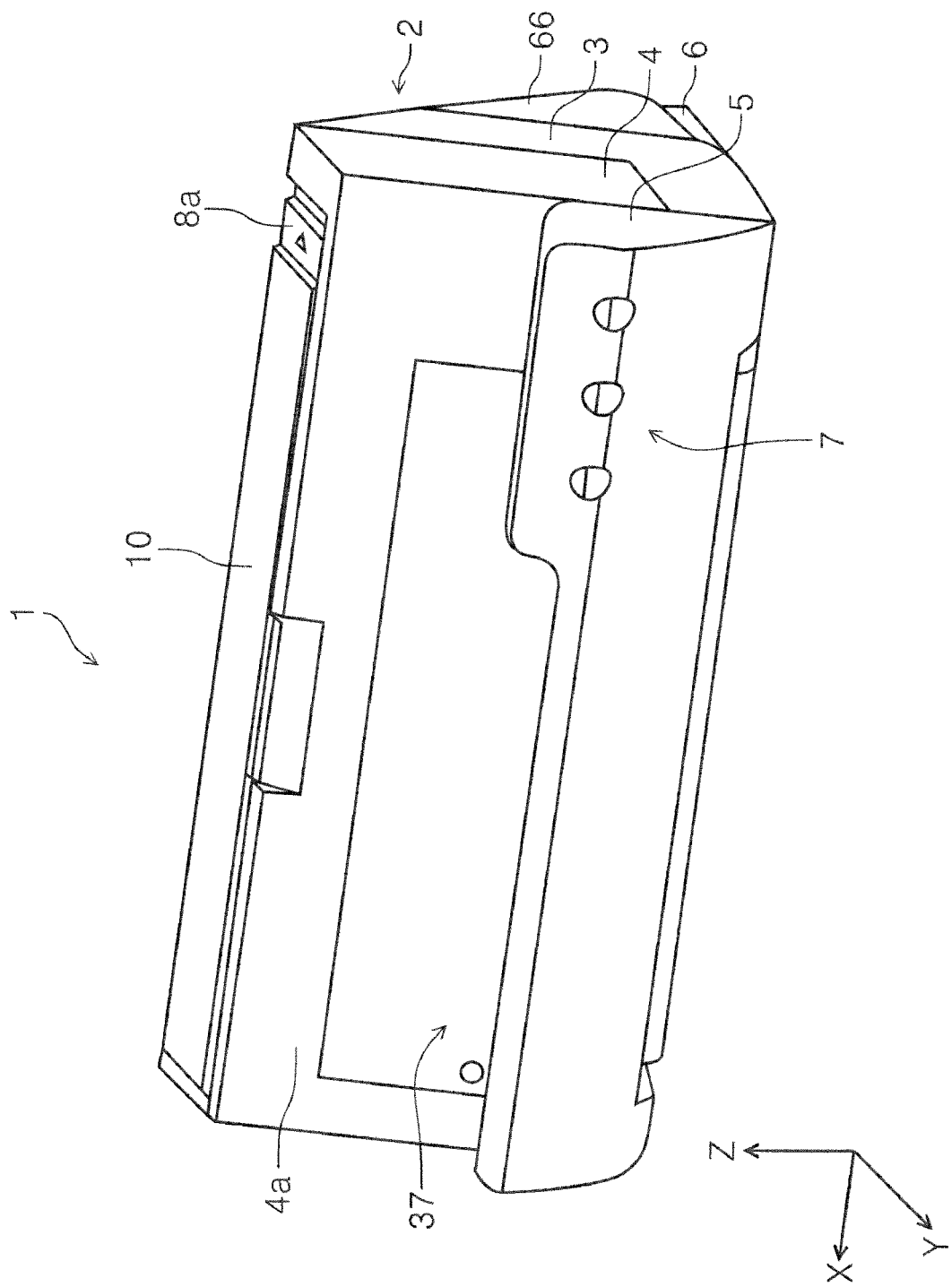
FIG. 1 is a perspective view of a scanner viewed from the front, in which an apparatus body is in a normal reading posture.

The present disclosure will be schematically described below.

An image reading apparatus according to a first aspect includes a body supporting portion mounted on a mounting surface of the apparatus, and an apparatus body supported by the body supporting portion. The apparatus body includes a reading transportation path being an original transportation path configured to transport an original and opposed to a reading unit that reads the original, a reverse transportation path being an original transportation path located downstream of the reading transportation path and used when the original subjected to reading is reversed upward and discharged, a non-reverse transportation path being another original transportation path located downstream of the reading transportation path and configured to discharge the original subjected to reading without reversing the original, and a transportation path switching unit configured to switch the original transportation path to be coupled to the reading transportation path to any of the reverse transportation path and the non-reverse transportation path. The apparatus body is turnably provided to the body supporting portion. The apparatus body is turned so as to switch between a first posture and a second posture, the second posture forming an angle between the reading transportation path and the mounting surface being smaller than the corresponding angle formed in the first posture. The transportation path switching unit couples the reading transportation path to the reverse transportation path when the apparatus body takes the first posture, and couples the reading transportation path to the non-reverse transportation path when the apparatus body takes the second posture.

According to this aspect, the image reading apparatus can switch between the reverse transportation path and the non-reverse transportation path. Thus, the image reading apparatus can favorably transport a less flexible original by using the non-reverse transportation path. Here, the apparatus body is turned so as to switch between the first posture and the second posture that forms the angle between the reading transportation path and the mounting surface being smaller than the corresponding angle formed in the first posture. Moreover, the transportation path switching unit couples the reading transportation path to the reverse transportation path when the apparatus body takes the first posture, and couples the reading transportation path to the non-reverse transportation path when the apparatus body takes the second posture. In this way, a direction to discharge the original can be set to the direction along the mounting surface as compared to the case of discharging the original by using the non-reverse transportation path when taking the first posture. As a consequence, it is possible to discharge the original that is larger in size as compared to the mode of discharging the original by using the non-reverse transportation path when taking the first posture.

By setting the apparatus body to the first posture, it is possible to increase the angle formed between the reading transportation path and the mounting surface as compared to that in the second posture, thereby reducing a footprint of the apparatus body.

A second aspect provides the image reading apparatus according to the first aspect, in which the apparatus body includes a pair of discharge rollers that discharge the original from the non-reverse transportation path, and a common tangent to the pair of discharge rollers in a side view of the original transportation path intersects with the body supporting portion in the first posture and does not intersect with the body supporting portion in the second posture.

According to this aspect, the common tangent to the pair of discharge rollers in the side view of the original transportation path intersects with the body supporting portion in the first posture and does not intersect with the body supporting portion in the second posture. Accordingly, the original to be discharged when discharging the original by using the non-reverse transportation path is less likely to come into contact with the body supporting portion. Thus, it is possible to appropriately discharge the original that is large in size.

A third aspect provides the image reading apparatus according to the first or second aspect, in which a discharge position to discharge the original by using the non-reverse transportation path becomes higher in terms of a vertical direction when the apparatus body takes the second posture than when the apparatus body takes the first posture.

According to this aspect, the discharge position to discharge the original by using the non-reverse transportation path becomes higher in terms of the vertical direction when the apparatus body takes the second posture than when the apparatus body takes the first posture. Accordingly, the original to be discharged when discharging the original by using the non-reverse transportation path is less likely to come into contact with the body supporting portion or the mounting surface. Thus, it is possible to appropriately discharge the original that is large in size.

A fourth aspect provides the image reading apparatus according to any one of the first to third aspects, in which the transportation path switching unit includes a flap member configured to switch the posture, and is configured to switch the original transportation path coupled to the reading transportation path to any of the reverse transportation path and the non-reverse transportation path by posture switching of the flap member, and a posture of the flap member is switched in conjunction with posture switching of the apparatus body.

According to this aspect, the transportation path switching unit includes the flap member configured to switch the posture, and is configured to switch the original transportation path to be coupled to the reading transportation path to any of the reverse transportation path and the non-reverse transportation path by posture switching of the flap member. Thus, it is possible to construct the transportation path switching unit with a simple structure.

A fifth aspect provides the image reading apparatus according to any one of the first to fourth aspects, which further includes a motor serving as a power source to turn the apparatus body, and a rotation transforming unit that transforms rotation of the motor into a turn of the apparatus body.

According to this aspect, there are provided the motor serving as the power source for turning the apparatus body and the rotation transforming unit that transforms the rotation of the motor into the turn of the apparatus body. As a consequence, a user is not required to directly turn the apparatus body, and the usability of the user is thus improved.

A sixth aspect provides the image reading apparatus according to the fifth aspect, in which the motor is provided to the apparatus body, and the rotation transforming unit includes a gear rotatably provided to the apparatus body and configured to be rotated by power from the motor, and a thread portion fixed to the body supporting portion and threadedly engaged with the gear.

According to this aspect, it is possible to construct the rotation transforming unit with a simple structure.

A seventh aspect provides the image reading apparatus according to fifth or sixth aspect, which further includes a posture detection unit configured to detect the posture of the apparatus body. A controlling portion that controls the motor controls, based on detection information from the posture detection unit, the posture of the apparatus body.

According to this aspect, there is provided the posture detection unit for detecting the posture of the apparatus body. The controlling portion that controls the motor controls the posture of the apparatus body based on detection information from the posture detection unit. Accordingly, it is possible to keep the apparatus body from taking a halfway posture, that is, a posture which is neither the first posture nor the second posture.

An eighth aspect provides the image reading apparatus according to seventh aspect, which further includes an encoder sensor that detects an amount of rotation and a direction of rotation of the motor.

According to this aspect, there is provided the encoder sensor that detects the amount of rotation and the direction of rotation of the motor. Thus, the motor can be controlled more appropriately.

A ninth aspect provides the image reading apparatus according to any one of the first to eighth aspects, which further includes a first turn control unit that controls a turn limit when the apparatus body is turned from the second posture to the first posture, and a second turn control unit that controls a turn limit when the apparatus body is turned from the first posture to the second posture. The first posture of the apparatus body is controlled by the first turn control unit, and the second posture of the apparatus body is controlled by the second turn control unit.

According to this aspect, the first posture of the apparatus body is controlled by the first turn control unit while the second posture of the apparatus body is controlled by the second turn control unit. Thus, it is possible to accurately control the first posture and the second posture of the apparatus body.

A tenth aspect provides the image reading apparatus according to the first aspect, which further includes a pair of first transportation rollers provided to the reading transportation path and located upstream of the reading unit, and a pair of second transportation rollers provided to the reading transportation path and located downstream of the reading unit. The pair of first transportation rollers include a first lower roller that comes into contact with a lower surface of the original transported on the reading transportation path, and a first upper roller that comes into contact with an upper surface of the original transported on the reading transportation path. The pair of second transportation rollers include a second lower roller that comes into contact with the lower surface of the original, and a second upper roller that comes into contact with the upper surface of the original. The first lower roller, the first upper roller, the second lower roller, and the second upper roller are rotationally driven by a driving source.

According to this aspect, all of the first lower roller, the first upper roller, the second lower roller, and the second upper roller are driven by the driving source. Thus, it is possible to reliably transport the original having a large thickness.

An eleventh aspect provides the image reading apparatus according to the tenth aspect, in which the first upper roller is provided and configured to approach and recede from the first lower roller, the second upper roller is provided and configured to approach and recede from the second lower roller, and power is transmitted from the driving source to the first upper roller and the second upper roller by using a universal joint.

According to this aspect, the power is transmitted from the driving source to the movable first upper roller and the movable second upper roller by using the universal joint. Accordingly, it is possible to appropriately transmit the power from the driving source to the movable first upper roller and the movable second upper roller.

A twelfth aspect provides the image reading apparatus according to the tenth or eleventh aspect, in which the apparatus body includes a first unit provided with the first lower roller and the second lower roller, and a second unit provided with the first upper roller and the second upper roller, and configured to be opened and closed relative to the first unit.

According to this aspect, the second unit provided with the first upper roller and the second upper roller is openable and closable relative to the first unit provided with the first lower roller and the second lower roller. Thus, the nipping by the pair of first transportation rollers and the pair of second transportation rollers is released by opening the second unit, so that the original can be easily removed when the original is jammed.

A thirteenth aspect provides the image reading apparatus according to the twelfth aspect, which further includes a pair of third transportation rollers provided to the reverse transportation path and located downstream of the pair of second transportation rollers, and a pair of fourth transportation rollers provided to the reverse transportation path and located downstream of the pair of third transportation rollers. The pair of third transportation rollers include a third driving roller configured to come into contact with the lower surface of the original and subjected to driving, and a third driven roller configured to come into contact with the upper surface of the original and to be rotationally driven in contact with the original. The pair of fourth transportation rollers include a fourth driving roller configured to come into contact with the lower surface of the original and subjected to driving, and a fourth driven roller configured to come into contact with the upper surface of the original and to be rotationally driven in contact with the original. The second unit includes the third driven roller and the fourth driven roller. The apparatus body includes a third unit provided with the third driving roller and the fourth driving roller, and configured to be opened and closed relative to the second unit.

According to this aspect, the third unit provided with the third driving roller and the fourth driving roller is openable and closable relative to the second unit provided with the third driven roller and the fourth driven roller. Thus, the nipping by the pair of third transportation rollers and the pair of fourth transportation rollers is released by opening the third unit, so that the original can be easily removed when the original is jammed.

A fourteenth aspect provides the image reading apparatus according to any one of the first to thirteenth aspects, which includes an original supporting portion that supports the original to be fed, a feed roller that feeds the original from the original supporting portion, and a separation roller that nips the original in cooperation with the feed roller. The separation roller is configured to switch between a state of separation to separate the original and a state of non-separation not to separate the original. The separation roller establishes the state of separation when the apparatus body is in the first posture and establishes the state of non-separation when the apparatus body is in the second posture.

Accordingly to this aspect, the separation roller establishes the state of non-separation when the apparatus body takes the second posture being the posture to discharge the original having high rigidity. As a consequence, when feeding a booklet representing an example of the original having high rigidity, it is possible to feed the booklet appropriately.

Now, the present disclosure will be specifically described.

In the following description, a scanner 1 that can read at least one face out of a first face of an original and a second face on an opposite side thereof will be discussed as an example of an image reading apparatus. The scanner 1 is a so-called sheet feed-type scanner which performs reading while moving an original relative to a reading unit to be described later.

In this specification, the original is assumed to include not only an original in the form of a sheet but also an original in the form of a card and an original in the form of a booklet.

In the XYZ coordinate system shown in the drawings, X axis direction is an apparatus width direction and also an original width direction. Meanwhile, Y axis direction is an apparatus depth direction while Z axis direction is a direction along a vertical direction.

In the present embodiment, +Y direction is defined as a direction from a back face of the apparatus to a front face thereof while −Y direction is defined as a direction from the front face of the apparatus to the back face thereof. Meanwhile, a leftward direction viewed from the front face of the apparatus is defined as +X direction while a rightward direction viewed likewise is defined as −X direction.

In the following description, a direction to which the original is transported may be referred to as "downstream" while an opposite direction thereto may be referred to as "upstream" as appropriate.

Figure 2:
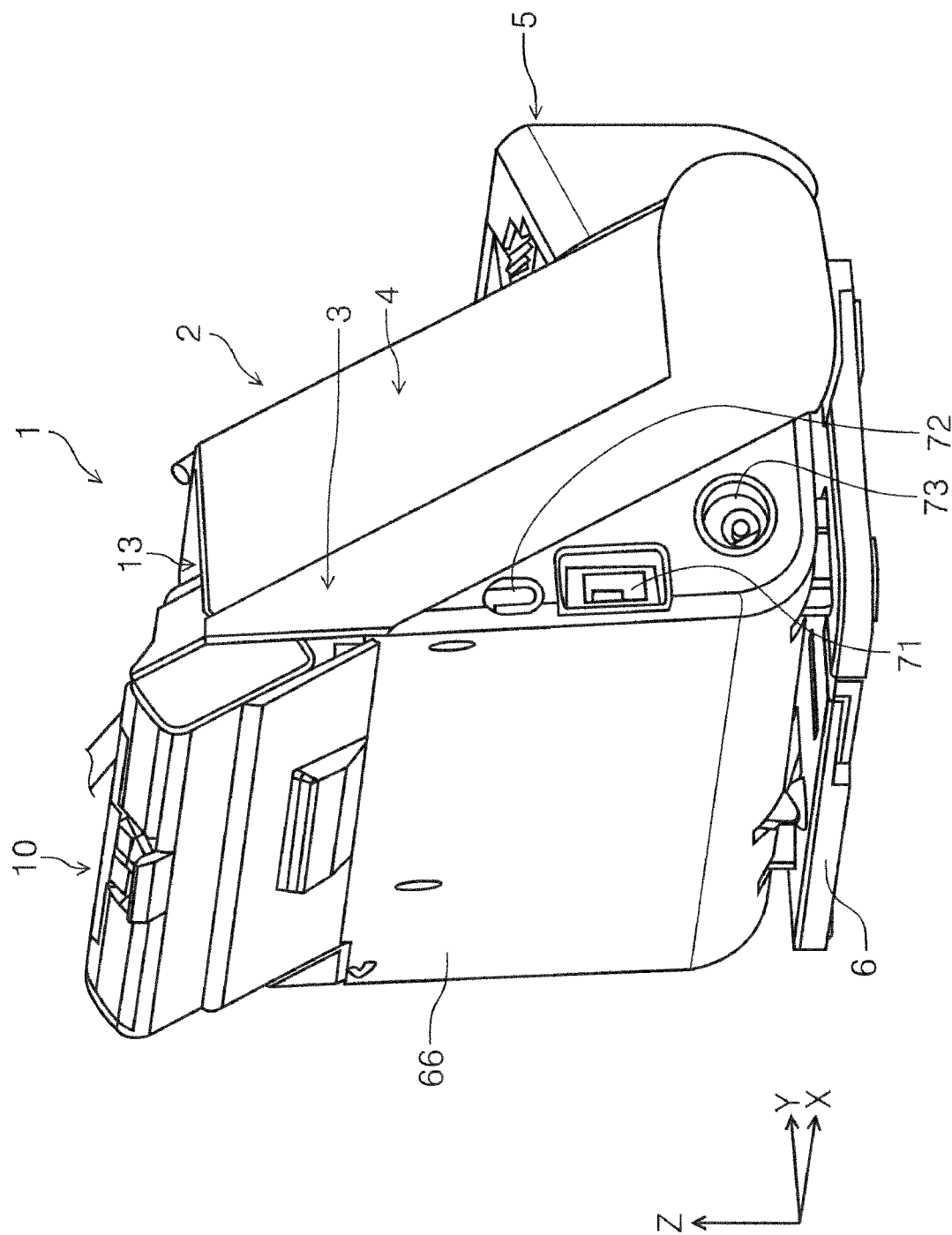
FIG. 2 is a perspective view of the scanner viewed from the back, in which the apparatus body is in the normal reading posture.

In FIGS. 1 and 2, the scanner 1 includes an apparatus body 2, and a body supporting portion 6 which rotatably supports the apparatus body 2.

The apparatus body 2 includes a first unit 3, a second unit 4, and a third unit 5.

Figure 3:
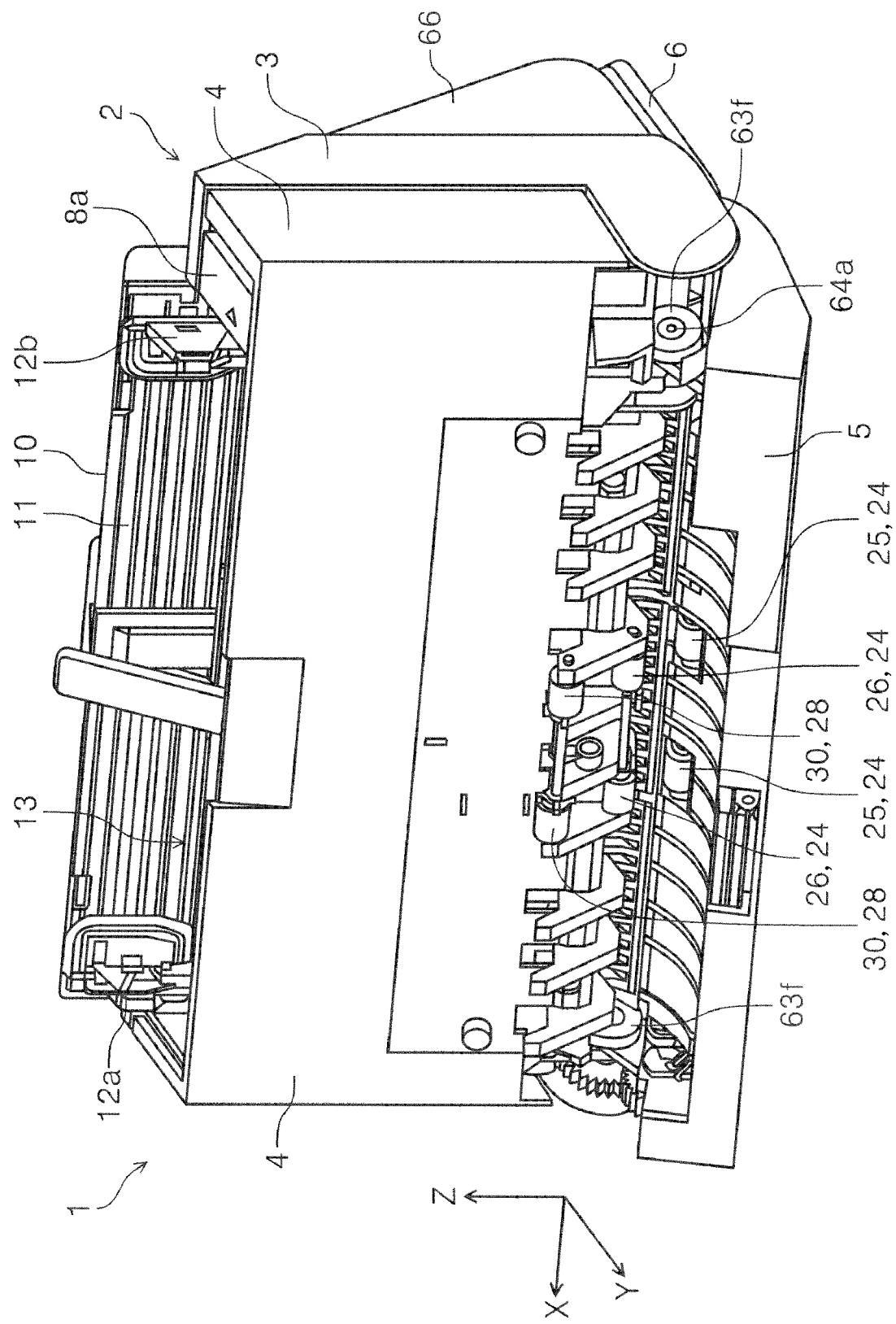
FIG. 3 is a perspective view of the scanner in a state of opening a third unit viewed from the front, in which the apparatus body is in the normal reading posture.
Figure 16:
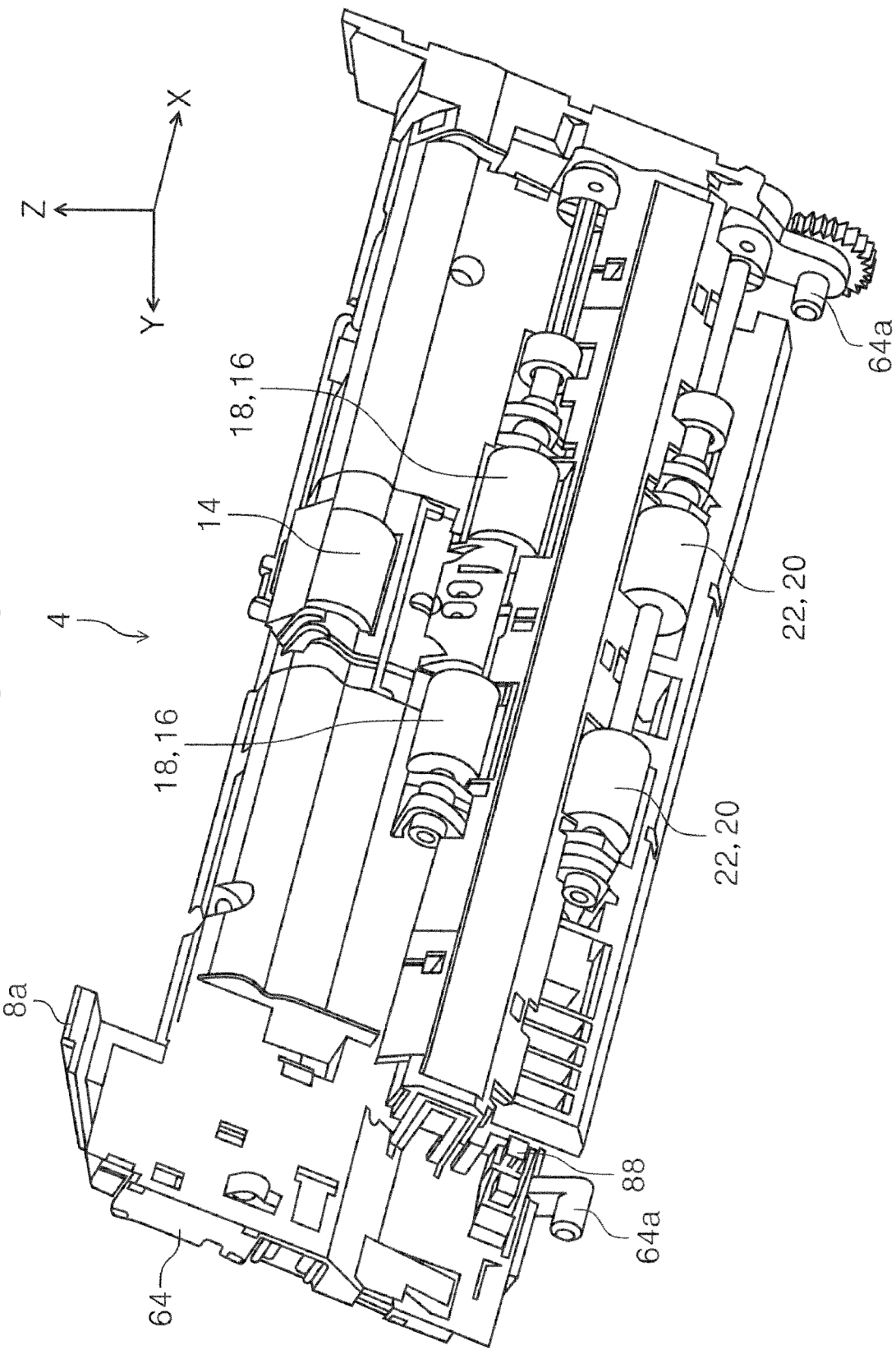
FIG. 16 is a perspective view of the second unit.

The second unit 4 and the third unit 5 are provided in such a way as to be rotatable around frame rotating shafts 64a (see FIGS. 3 and 16). The frame rotating shafts 64a are rotating shafts that constitute the center of a rotation axis parallel to the X axis direction.

Figure 4:
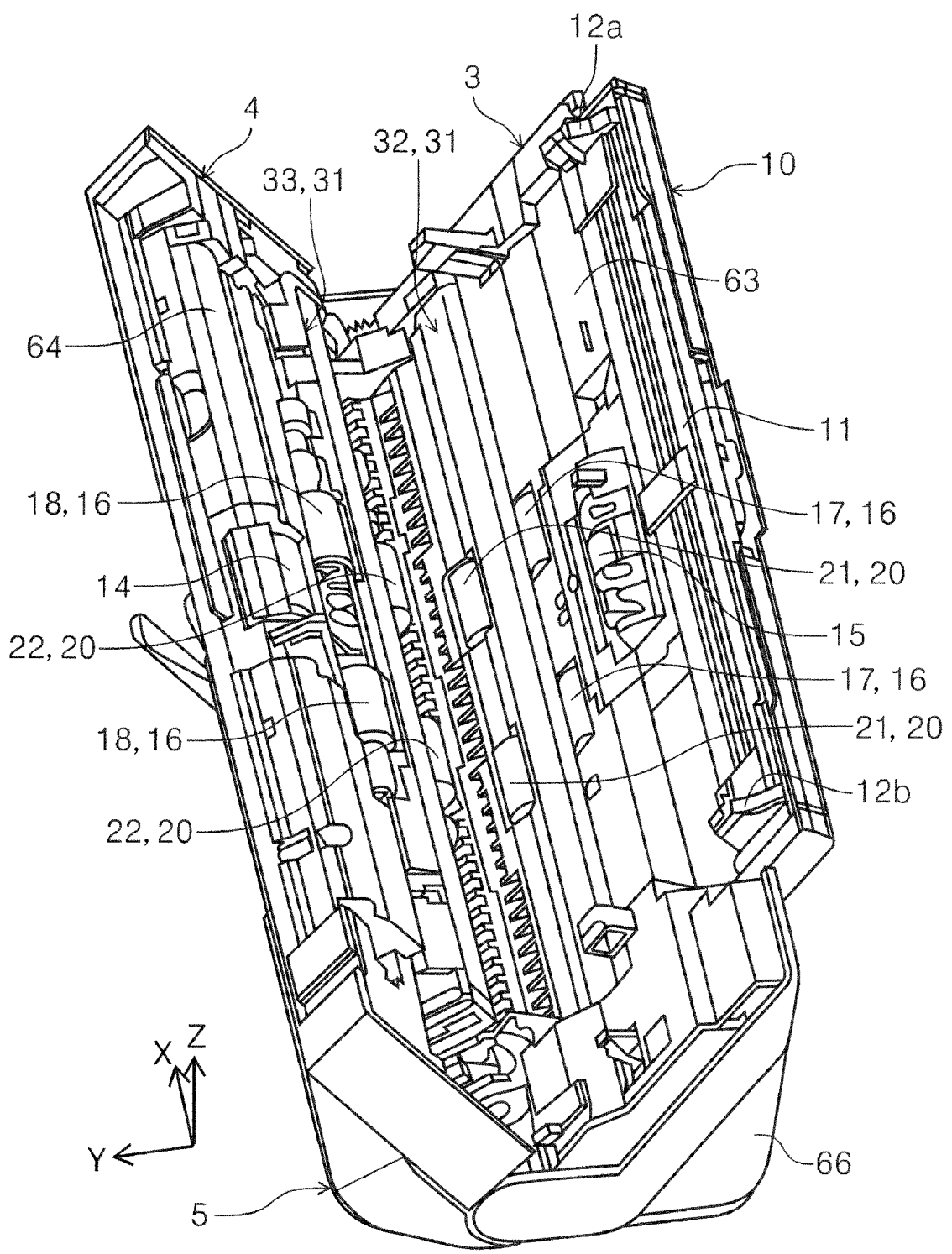
FIG. 4 is a perspective view of the scanner in a state of opening a second unit viewed from above, in which the apparatus body is in the normal reading posture.

The second unit 4 and the third unit 5 can be integrally rotated around the frame rotating shafts 64a relative to the first unit 3 (see FIG. 4). Reference sign 8a denotes an unlocking portion. A user can unlock the second unit 4 and the third unit 5 from the first unit 3 by sliding the unlocking portion 8a in the −X direction. Then, it is possible to partially expose an original transportation path as shown in FIG. 4 by rotating the second unit 4 and the third unit 5 relative to the first unit 3. In particular, it is possible to expose an original feeding path R1 and a reading transportation path R2 to be described later.

The third unit 5 can be rotated around the frame rotating shafts 64a relative to the first unit 3 and the second unit 4 (see FIG. 3). By rotating the third unit 5 relative to the first unit 3 and the second unit 4, it is possible to partially expose the original transportation path as shown in FIG. 3. In particular, it is possible to expose a reverse transportation path R3 to be described later.

Figure 5:
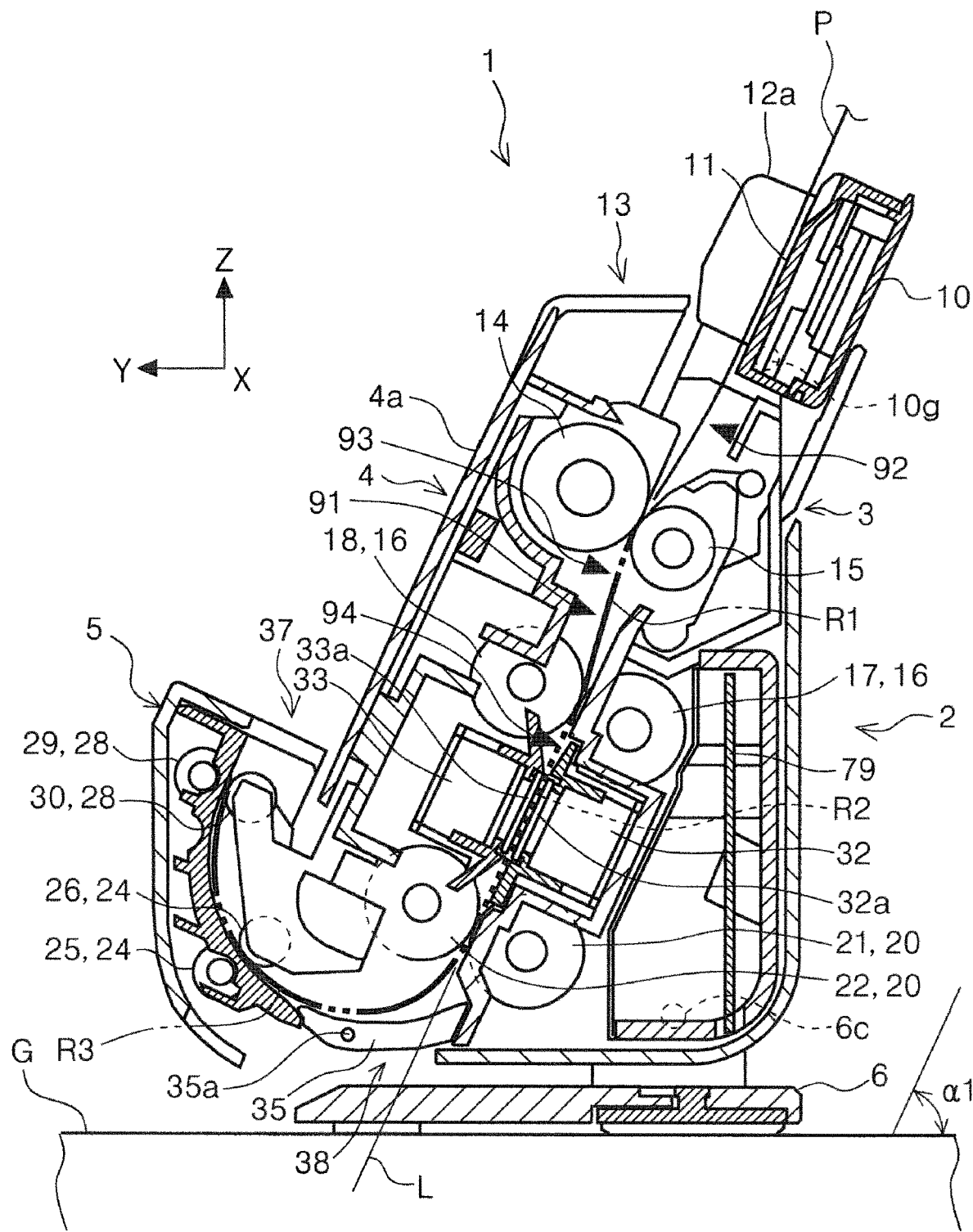
FIG. 5 is a cross-sectional view of an original transportation path of the scanner viewed in a width direction, in which the apparatus body is in the normal reading posture.
Figure 6:
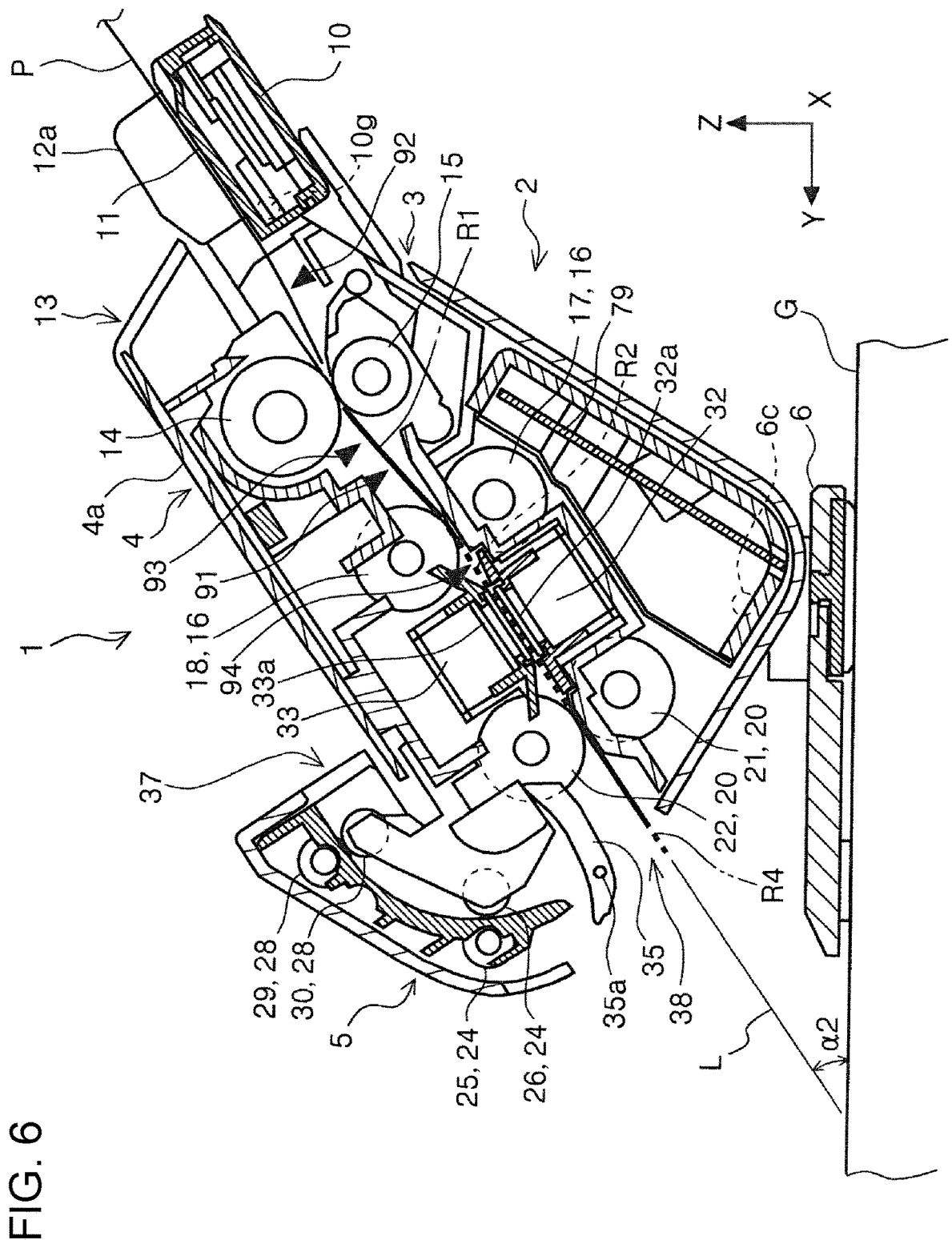
FIG. 6 is a cross-sectional view of the original transportation path of the scanner viewed in the width direction, in which the apparatus body is in a booklet reading posture.

The apparatus body 2 can be rotated around body rotating shafts 6c (see FIGS. 7 and 8) relative to the body supporting portion 6. In the present embodiment, the apparatus body 2 can retain two postures by being turned. The two postures of the apparatus body 2 are illustrated in FIGS. 5 and 6. In the following description, the posture in FIG. 5 will be referred to as a normal reading posture while the posture in FIG. 6 will be referred to as a booklet reading posture. The normal reading posture represents an example of a first posture of the apparatus body 2 while the booklet reading posture represents an example of a second posture of the apparatus body 2.

Although details will be described later, the first posture of the apparatus body 2 is a posture in which the reading transportation path R2 is coupled to the reverse transportation path R3 by using a flap 35 (a transportation path switching unit). The second posture of the apparatus body 2 is a posture in which the reading transportation path R2 is coupled to a non-reverse transportation path R4 by using the flap 35 (the transportation path switching unit).

Each of an angle α1 shown in FIG. 5 and an angle α2 shown in FIG. 6 is an angle formed between the reading transportation path R2 and a mounting surface G of the apparatus to be described later. The angle α2 formed between the reading transportation path R2 and a mounting surface G in the booklet reading posture is smaller than the angle α1 formed between the reading transportation path R2 and a mounting surface G in the normal reading posture.

In the normal reading posture, a projected area of the apparatus body 2 onto the mounting surface G to mount the scanner 1 is the smallest. In other words, this is the posture in which a footprint of the apparatus body 2 is the smallest.

Note that the footprint in this specification means an occupied area of the apparatus body 2 on the X-Y plane in a top-down view of the apparatus body 2 from above.

The normal reading posture is suitable for reading an original in the form of a sheet, or in other words, the original which has low rigidity and high flexibility. The booklet reading posture is suitable for reading an original in the form of a plastic card, a booklet, or the like which has high rigidity and low flexibility.

An operating portion 7 formed from multiple operating buttons including a power button is provided at the front face of the apparatus.

Among side faces constituting the periphery of the apparatus, a side face in the +X direction is provided with a first coupling portion 71, a second coupling portion 72, and a third coupling portion 73 as shown in FIG. 2. The first coupling portion 71 is a coupling portion to be coupled to a USB Type-A plug (not shown) that represents an example of a coupling target. The second coupling portion 72 is a coupling portion to be coupled to a USB Type-C plug (not shown) that represents another example of the coupling target. The third coupling portion 73 is a coupling portion to be coupled to a power supply plug (not shown) for supplying electric power to the apparatus body 2.

Note that USB stands for Universal Serial Bus, and each of Type-A and Type-C represents one of types defined in the USB standards.

An external device can be coupled to the first coupling portion 71 through a USB cable (not shown). In addition, it is also possible to couple a storage medium such as a USB memory (not shown) thereto. Then, a controlling portion 80 (see FIG. 12) can save readout data in the storage medium coupled to the first coupling portion 71.

Another external device can be coupled to the second coupling portion 72 through a USB cable (not shown).

The first coupling portion 71, the second coupling portion 72, and the third coupling portion 73 are provided on a circuit board 79 (see FIG. 7) located on the back face side of the apparatus.

In the present embodiment, the apparatus body 2 is also configured to be capable of receiving power supply from the external device coupled to the second coupling portion 72.

Next, a configuration of the original transportation path in the scanner 1 will be described with reference to FIGS. 5 and 6. The original to be fed is supported in an inclined posture by an original supporting portion 11. A reference sign P denotes the supported original. When two or more original sheets are supported by the original supporting portion 11, the uppermost original is sent downstream by a feed roller 14. The original supporting portion 11 is formed at an upper opening/closing portion 10. The upper opening/closing portion 10 can be turned around a not-illustrated rotating shaft.

The upper opening/closing portion 10 is turned so as to open and close a feed port 13. FIG. 1 shows a state where the upper opening/closing portion 10 is closed and FIG. 2 shows a state where the upper opening/closing portion 10 is opened. The upper opening/closing portion 10 constitutes the first unit 3.

The original supporting portion 11 is provided with a pair of edge guides 12a and 12b that guide side edges of the original as shown in FIG. 3. The pair of edge guides 12a and 12b are slidably provided in an original width direction (the X axis direction). Using a not-illustrated rack and pinion mechanism, the pair of edge guides 12a and 12b are provided in such an interlocking manner to recede from each other or to come close to each other while interposing a central position in the original width direction in between. In other words, the scanner 1 adopts a so-called center feeding method.

Back to FIGS. 5 and 6, the feed roller 14 is provided to the second unit 4. The feed roller 14 is rotated by obtaining power from a transportation motor 50 to be described later. A separation roller 15 is provided at a position opposed to the feed roller 14 in the first unit 3. Rotation torque is applied to the separation roller 15 by using a not-illustrated torque limiter so as to suppress double feeding of the original sheets.

The feed roller 14 and the separation roller 15 are located at the central position in the original width direction (see FIG. 4).

Here, a separation pad may be provided instead of the separation roller 15.

The present embodiment discloses the configuration in which the feed roller 14 is provided on an upper side of the originals mounted on the original supporting portion 11 so as to feed the uppermost original. Instead, the feed roller 14 may be provided on a lower side of the originals mounted on the original supporting portion 11 so as to feed the lowermost original.

The separation roller 15 and the not-illustrated torque limiter are configured to be capable of being coupled to each other through a not-illustrated gear. Moreover, a second solenoid 95 (see FIG. 12) displaces the not-illustrated gear so as to be able to switch between a state where the separation roller 15 and the torque limiter are coupled to each other, that is, a state of separation to separate the original, and a state where the separation roller 15 and the torque limiter are not coupled to each other, that is, a state of non-separation not to separate the original. Moreover, the controlling portion 80 (see FIG. 12) configured to control the second solenoid 95 controls the second solenoid 95 so as to establish the state of separation when the apparatus body 2 is in the normal reading posture and to establish the state of non-separation when the apparatus body 2 is in the booklet reading posture.

Pairs of first transportation rollers 16 are provided downstream of the feed roller 14 and the separation roller 15. Each pair of first transportation rollers 16 are formed from a first lower roller 17 provided to the first unit 3 and a first upper roller 18 provided to the second unit 4. The first upper roller 18 is provided in such a way as to be capable of approaching and receding from the first lower roller 17, and is pressed against the first lower roller 17 by using a not-illustrated pressing member such as a coil spring.

Both the first lower roller 17 and the first upper roller 18 are rotated by obtaining the power from the transportation motor 50 to be described later. Two first lower rollers 17 and two first upper rollers 18 are provided such that the central position in the original width direction is interposed between the two first lower rollers 17 and between the two first upper rollers 18 (see FIG. 4).

When the second unit 4 is closed relative to the first unit 3, each first lower roller 17 comes into contact with the corresponding first upper roller 18. When the second unit 4 is opened relative to the first unit 3, each first upper roller 18 is detached from the corresponding first lower roller 17.

A first reading unit 32 and a second reading unit 33 are disposed downstream of the pair of first transportation rollers 16 in such a way as to face each other. The first reading unit 32 is provided to the first unit 3 while the second reading unit 33 is provided to the second unit 4. The first reading unit 32 reads a lower surface (a first surface) of the original supported by the original supporting portion 11, while the second reading unit 33 reads an upper surface (a second surface) of the original supported by the original supporting portion 11. The second reading unit 33 is provided in such a way as to be capable of approaching and receding from the first reading unit 32, and is pressed against the first reading unit 32 by using a not-illustrated pressing member such as a coil spring.

In the present embodiment, each of the first reading unit 32 and the second reading unit 33 is formed from a contact image sensor module (CISM). Reference sign 32a denotes a contact glass member that constitutes the first reading unit 32 and reference sign 33a denotes a contact glass member that constitutes the second reading unit 33.

Pairs of second transportation rollers 20 are provided downstream of the first reading unit 32 and the second reading unit 33. Each pair of second transportation rollers 20 are formed from a second lower roller 21 provided to the first unit 3 and a second upper roller 22 provided to the second unit 4. The second upper roller 22 is provided in such a way as to be capable of approaching and receding from the second lower roller 21, and is pressed against the second lower roller 21 by using a not-illustrated pressing member such as a coil spring.

Both the second lower roller 21 and the second upper roller 22 are rotated by obtaining the power from the transportation motor 50 to be described later. Two second lower rollers 21 and two second upper rollers 22 are provided such that the central position in the original width direction is interposed between the two second lower rollers 21 and between the two second upper rollers 22 (see FIG. 4).

When the second unit 4 is closed relative to the first unit 3, each second lower roller 21 comes into contact with the corresponding second upper roller 22. When the second unit 4 is opened relative to the first unit 3, each second upper roller 22 is detached from the corresponding second lower roller 21.

A chain line indicated with reference sign R1 in each of FIGS. 5 and 6 denotes the original feed path. The original feeding path R1 is defined from a nipping position of the feed roller 14 and the separation roller 15 to a nipping position of the pair of first transportation rollers 16. A dashed line indicated with reference sign R2 in each of FIGS. 5 and 6 denotes the reading transportation path. The reading transportation path R2 is defined from the nipping position of the pair of first transportation rollers 16 to a nipping position of the pair of second transportation rollers 20. The reading transportation path R2 is the original transportation path opposed to the first reading unit 32 and the second reading unit 33.

When the apparatus body 2 is in the normal reading posture as shown in FIG. 5, the reverse transportation path R3 to be used in the case where the original subjected to reading is reversed upward and discharged is formed downstream of the reading transportation path R2. The reverse transportation path R3 is the original transportation path located downstream of the nipping position of the pair of second transportation rollers 20, which is the original transportation path for curving and reversing the original that is transported obliquely downward as indicated with a chain double-dashed line in FIG. 5, and then discharging the original obliquely upward from a first discharge port 37.

When the apparatus body 2 is in the booklet reading posture as shown in FIG. 6, the non-reverse transportation path R4 to be used when the original subjected to reading is discharged without reversing the original is formed downstream of the reading transportation path R2. The non-reverse transportation path R4 is the original transportation path located downstream of the nipping position of the pair of second transportation rollers 20, which is the original transportation path for discharging the original that is transported obliquely downward on the reading transportation path R2 as indicated with a chain double-dashed line in FIG. 6 obliquely downward from a second discharge port 38 as it is without curving and reversing the original.

Here, the pair of second transportation rollers 20 function as a pair of discharge rollers that discharge the original from the non-reverse transportation path R4.

The switching between the reverse transportation path R3 and the non-reverse transportation path R4 is carried out by the flap 35 serving as a flap member that constitutes the transportation path switching unit. The flap 35 is turnable around a flap rotating shaft 35a. The flap 35 couples the reverse transportation path R3 to the reading transportation path R2 or couples the non-reverse transportation path R4 to the reading transportation path R2 by being turned. Coupling the reverse transportation path R3 to the reading transportation path R2 means to establish an available state of the reverse transportation path R3 and also means to establish an unavailable state of the non-reverse transportation path R4. Likewise, coupling the non-reverse transportation path R4 to the reading transportation path R2 means to establish an available state of the non-reverse transportation path R4 and also means to establish an unavailable state of the reverse transportation path R3.

The flap 35 blocks the non-reverse transportation path R4 and opens the reverse transportation path R3 when the apparatus body 2 is in the normal reading posture, that is, in the first posture. The flap 35 blocks the reverse transportation path R3 and opens the non-reverse transportation path R4 when the apparatus body 2 is in the booklet reading posture, that is, in the second posture.

In the present embodiment, the flap 35 is configured to be turned in conjunction with switching the posture of the apparatus body 2. The present embodiment adopts a first solenoid 86 (see FIG. 12) as the configuration to turn the flap 35 in conjunction with switching the posture of the apparatus body 2. The controlling portion 80 (see FIG. 12) that performs a variety of control detects the posture of the apparatus body 2 based on a detection signal from either a first posture detection sensor 87 or a second posture detection sensor 88 to be described later, and then turns the flap 35 by driving the first solenoid 86 based on the detection signal. Here, the measure for turning the flap 35 is not limited only to the first solenoid 86, and another actuator such as a motor is acceptable. Alternatively, the flap 35 may be configured to be turned mechanically in conjunction with the posture of the apparatus body 2.

The transportation path switching unit corresponding to the flap 35 may be provided to the body supporting portion 6 instead of the apparatus body 2.

The reverse transportation path R3 is provided with pairs of third transportation rollers 24 and pairs of fourth transportation rollers 28.

Each pair of third transportation rollers 24 are formed from a third driving roller 25 which is provided to the third unit 5 and a third driven roller 26 which is provided to the second unit 4. The third driven roller 26 is provided in such a way as to be capable of approaching and receding from the third driving roller 25, and is pressed against the third driving roller 25 by using a not-illustrated pressing member such as a coil spring. The third driving roller 25 is subjected to driving by the transportation motor 50. The third driven roller 26 is a roller that is rotationally driven.

Each pair of fourth transportation rollers 28 are formed from a fourth driving roller 29 which is provided to the third unit 5 and a fourth driven roller 30 which is provided to the second unit 4. The fourth driven roller 30 is provided in such a way as to be capable of approaching and receding from the fourth driving roller 29, and is pressed against the fourth driving roller 29 by using a not-illustrated pressing member such as a coil spring. The fourth driving roller 29 is subjected to driving by the transportation motor 50. The fourth driven roller 30 is a roller that is rotationally driven.

Figure 18:
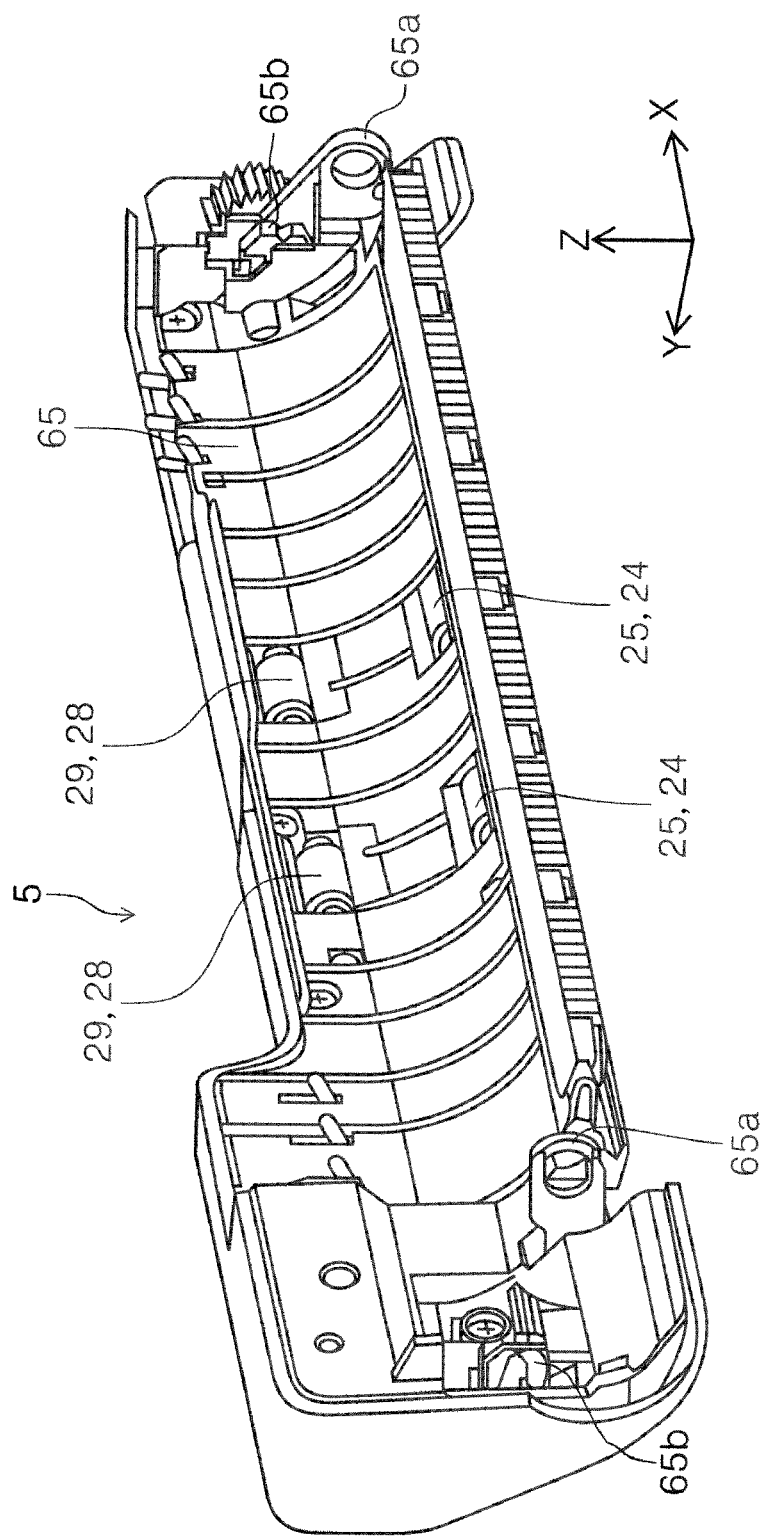
FIG. 18 is a perspective view of the third unit.

Two third driving rollers 25, two third driven rollers 26, two fourth driving rollers 29, and two fourth driven rollers 30 are provided such that the central position in the original width direction is interposed between the two third driving rollers 25, between the two third driven rollers 26, between the two fourth driving rollers 29, and between the two fourth driven rollers 30 (see FIGS. 3 and 18).

When the third unit 5 is closed relative to the second unit 4, each third driving roller 25 comes into contact with the corresponding third driven roller 26, and each fourth driving roller 29 also comes into contact with the corresponding fourth driven roller 30. When the third unit 5 is opened relative to the second unit 4, each third driving roller 25 is detached from the corresponding third driven roller 26, and each fourth driving roller 29 is also detached from the corresponding fourth driven roller 30.

The original transported on the reverse transportation path R3 is discharged by the pairs of fourth transportation rollers 28 in an obliquely upward direction including a −Y direction component, and is supported in an inclined posture by an upper face 4a of the second unit 4.

Next, a description will be given of a configuration for turning the apparatus body 2. In the present embodiment, the apparatus body 2 is turned by power from a posture switching motor 40 (see FIGS. 7 to 10) under control of the controlling portion 80, thereby switching its posture. The controlling portion 80 controls the posture switching motor 40 based on input information from an external device 100 coupled to the scanner 1.

Figure 7:
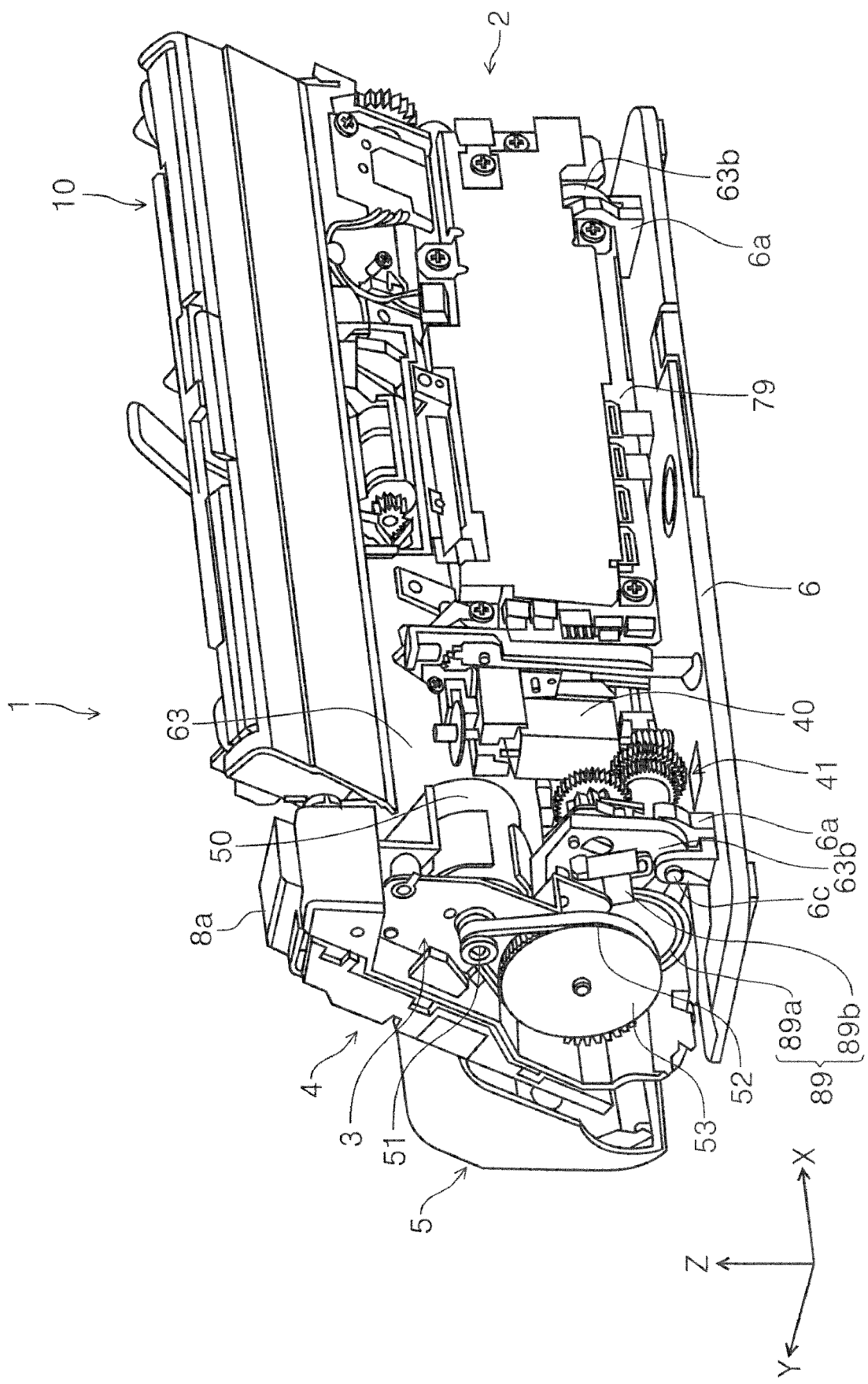
FIG. 7 is a perspective view of the scanner viewed from the back after detaching a rear face cover of a first unit.

FIG. 7 shows a state of detaching a rear face cover 66 (see FIG. 2) that constitutes an exterior of the back face of the apparatus. Reference sign 41 denotes a rotation transforming unit that transforms rotation of the posture switching motor 40 into a turn of the apparatus body 2. The posture switching motor 40 and the rotation transforming unit 41 are provided at positions close to a side surface in the −X direction in terms of the apparatus width direction. A position close to the side surface in the −X direction in terms of the apparatus width direction means a position in the −X direction relative to a central position of the apparatus in the X axis direction.

A first frame 63 constituting a base body of the first unit 3 is provided with two supported portions 63b with an interval in the X axis direction. The body supporting portion 6 is provided with the two body rotating shafts 6c with an interval in the X axis direction. The first frame 63, that is, the apparatus body 2 is capable of being turned around the body rotating shafts 6c as a consequence of penetration of the body rotating shafts 6c through the supported portions 63b. The body rotating shafts 6c are rotating shafts that define the center of a rotation axis parallel to the X axis direction.

The posture switching motor 40 is provided to the first frame 63. The posture switching motor 40 is provided on a back face side of the first frame 63 which is provided in an inclined posture.

Figure 8:
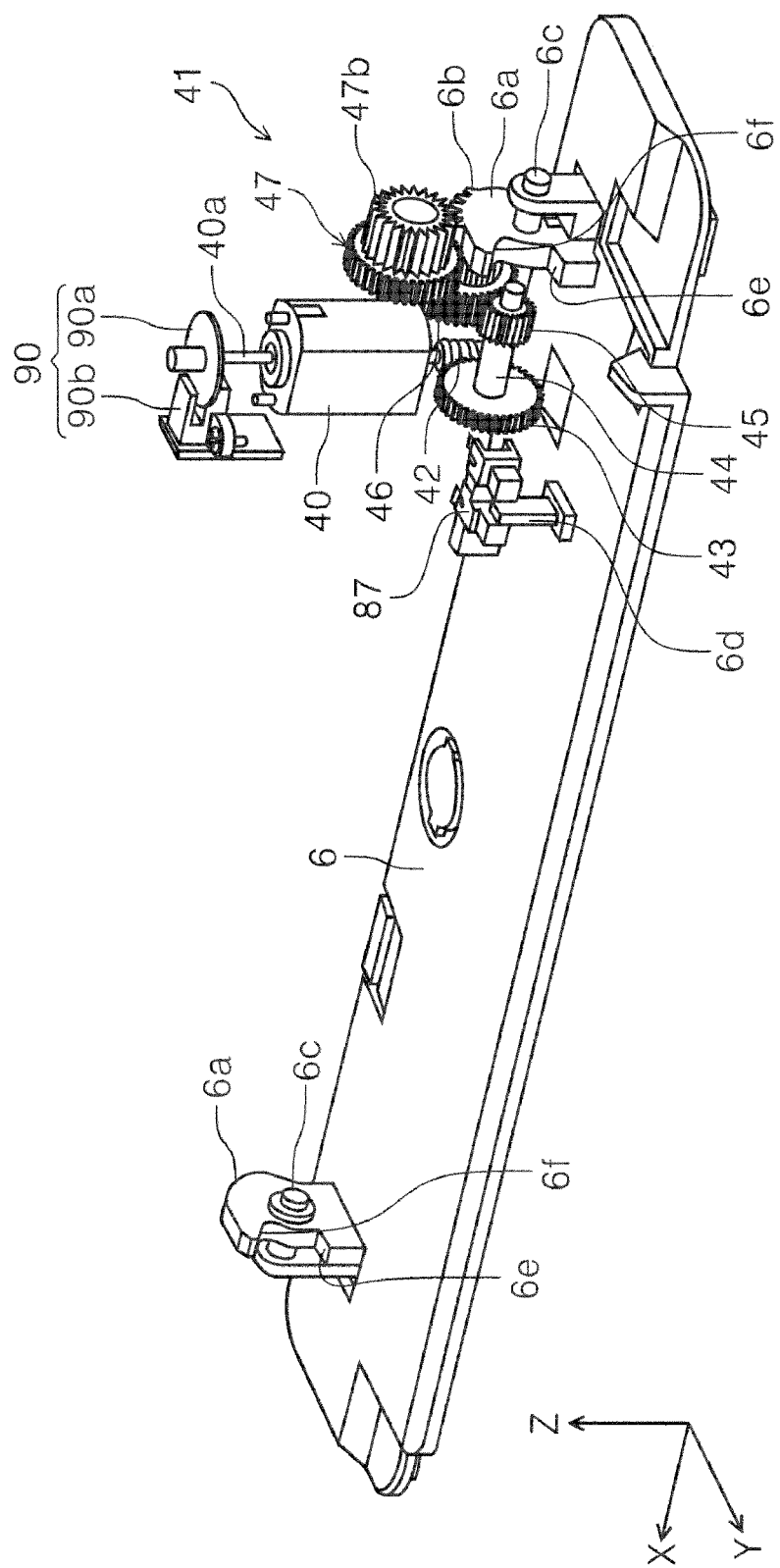
FIG. 8 is a perspective view showing configurations of a posture switching motor and a rotation transforming unit.
Figure 9:
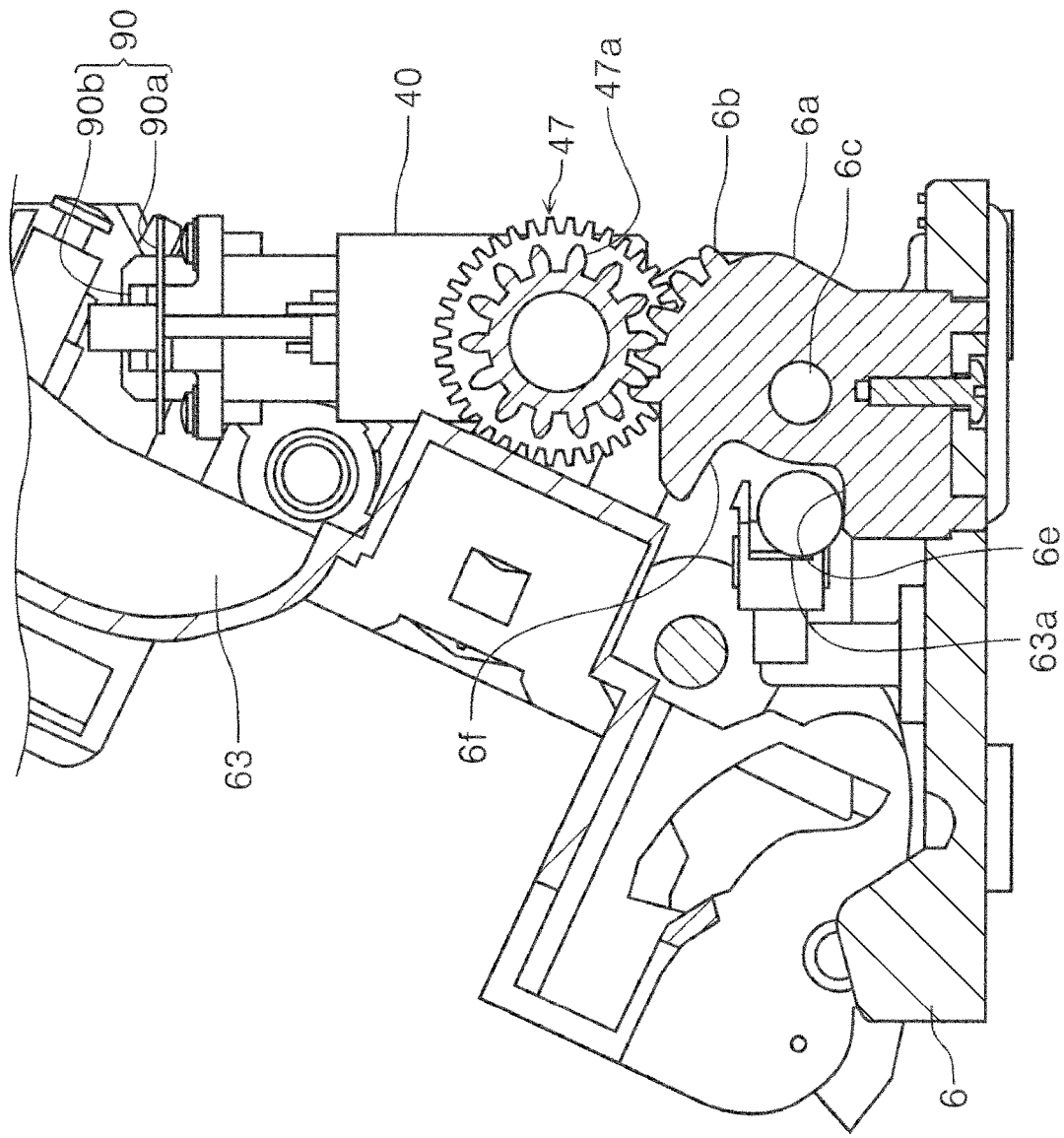
FIG. 9 is a cross-sectional view of the configurations of the posture switching motor and the rotation transforming unit viewed in the width direction when the apparatus body is in the normal reading posture.
Figure 10:
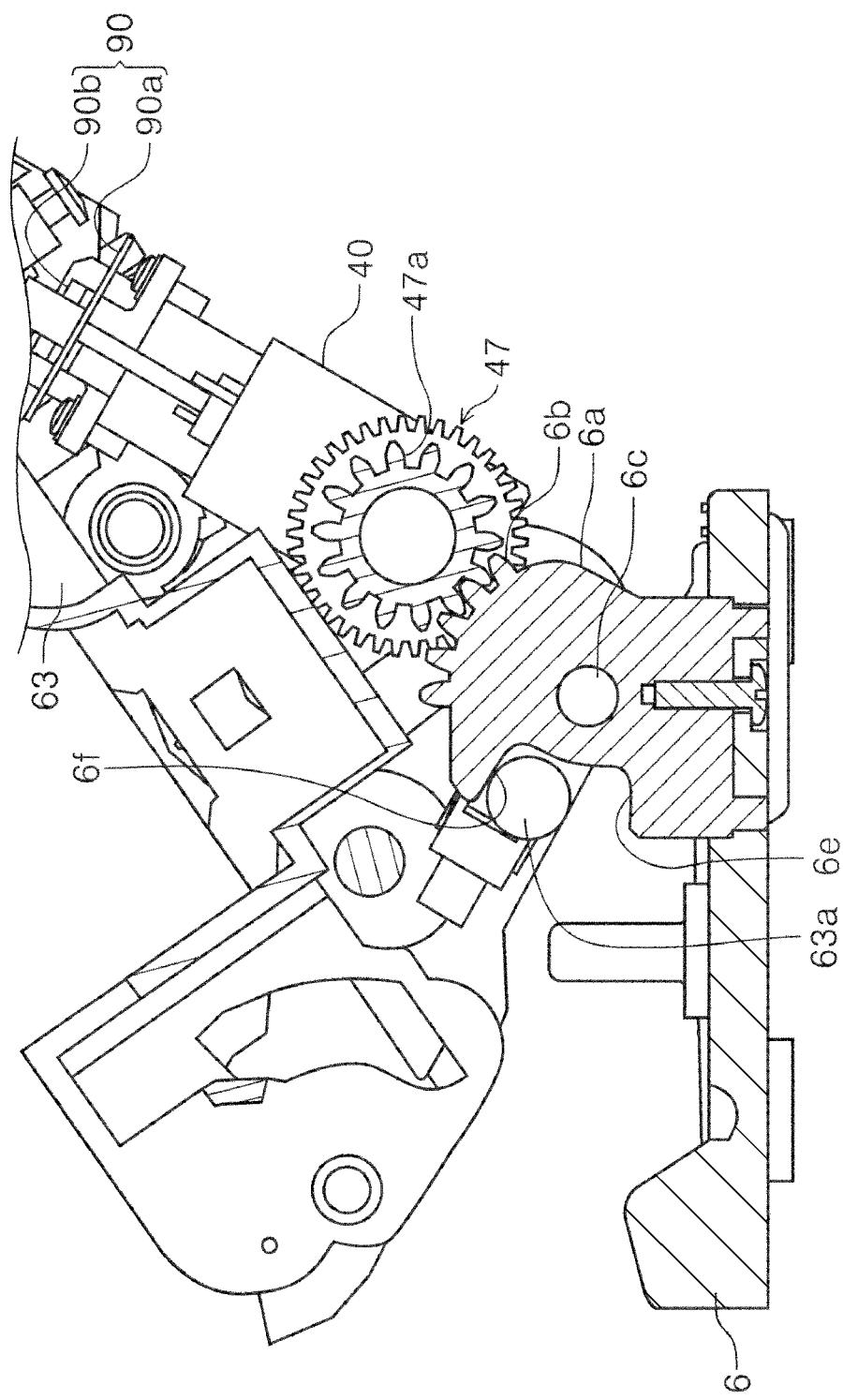
FIG. 10 is a cross-sectional view of the configurations of the posture switching motor and the rotation transforming unit viewed in the width direction when the apparatus body is in the booklet reading posture.

In FIG. 8, the rotation transforming unit 41 includes a gear 47b rotatably provided to the first unit 3 and configured to be rotated by the power from the posture switching motor 40, and a thread portion 6b fixed to the body supporting portion 6 and threadedly engaged with the gear 47b.

The thread portion 6b is a thread portion formed at an upright wall portion 6a and around the body rotating shaft 6c. The upright wall portion 6a is a member that constitutes the body supporting portion 6.

To be more precise, a worm gear 42 is provided to a rotating shaft of the posture switching motor 40, and the power is transmitted from the worm gear 42 to a gear 43. The gear 43 is formed integrally with a gear 45 through a shaft 44. The gear 45 transmits the power to a first composite gear 46, and the first composite gear 46 transmits the power to a second composite gear 47. The gear 47b constitutes a portion of the second composite gear 47.

The posture switching motor 40 and the above-described structure of the rotation transforming unit 41 except the thread portion 6b are provided to the first unit 3, that is, to the apparatus body 2. Accordingly, when the gear 47b is rotated by the power from the posture switching motor 40, the apparatus body 2 is turned so as to switch the posture as represented by a change from the state illustrated in FIG. 9 to the state illustrated in FIG. 10 or a change from the state in FIG. 10 to the state in FIG. 9.

In the present embodiment, the posture switching motor 40 and the above-described structure of the rotation transforming unit 41 except the thread portion 6b are provided to the first unit 3, that is, to the apparatus body 2. Meanwhile, the thread portion 6b is provided to the body supporting portion 6. Instead, the posture switching motor 40 and the above-described structure of the rotation transforming unit 41 except the thread portion 6b may be provided to the body supporting portion 6, and the thread portion 6b may be provided to the apparatus body 2.

Here, the upright wall portion 6a is provided with a first abutting portion 6e serving as a first turn control unit and a second abutting portion 6f serving as a second turn control unit. A boss 63a provided to the first frame 63 comes between the first abutting portion 6e and the second abutting portion 6f. When the apparatus body 2 is turned from the booklet reading posture shown in FIG. 10 toward the normal reading posture shown in FIG. 9, the boss 63a abuts against the first abutting portion 6e, thereby controlling the normal reading posture of the apparatus body 2. When the apparatus body 2 is turned from the normal reading posture shown in FIG. 9 toward the booklet reading posture shown in FIG. 10, the boss 63a abuts against the second abutting portion 6f, thereby controlling the booklet reading posture of the apparatus body 2.

A driving current value of the posture switching motor 40 rises when the boss 63a abuts against the first abutting portion 6e or when the boss 63a abuts against the second abutting portion 6f. Accordingly, the controlling portion 80 (see FIG. 12) can detect the posture of the apparatus body 2 based on a direction of rotation of the posture switching motor 40 and on the rise in the driving current value. However, in the present embodiment, the first posture detection sensor 87 and the second posture detection sensor 88 to be described later are provided so that the controlling portion 80 can also detect the posture of the apparatus body 2 based on the detection signals from these sensors.

Here, the normal reading posture and the booklet reading posture of the apparatus body 2 are retained by supplying the electric power to the posture switching motor 40 with not driving so as to establish a hold state.

The first posture detection sensor 87 is an optical sensor which is provided to the first frame 63, that is, to the apparatus body 2. When the apparatus body 2 is in the normal reading posture, a projection 6d provided to the body supporting portion 6 as shown in FIG. 8 blocks an optical axis of the first posture detection sensor 87. When the apparatus body 2 is turned from this state toward the booklet reading posture, the projection 6d deviates from the optical axis of the first posture detection sensor 87.

Figure 11A:
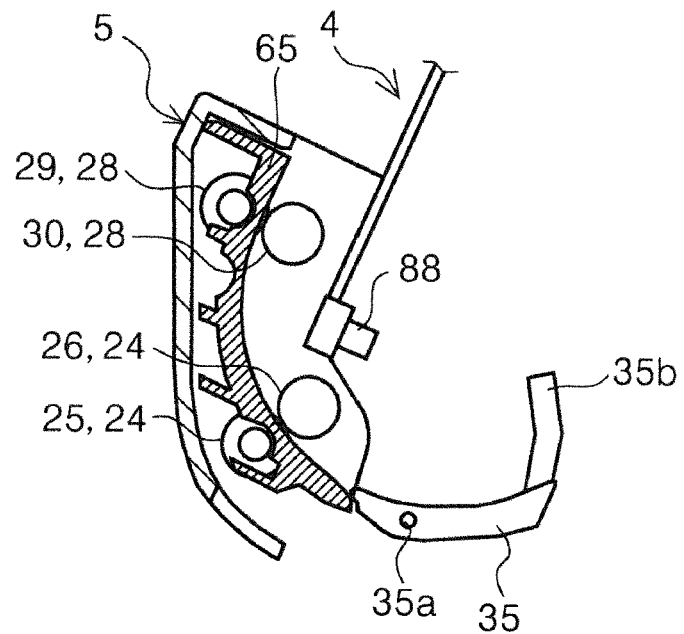
FIGS. 11A and 11B are diagrams showing a second posture detection sensor.
Figure 11B:
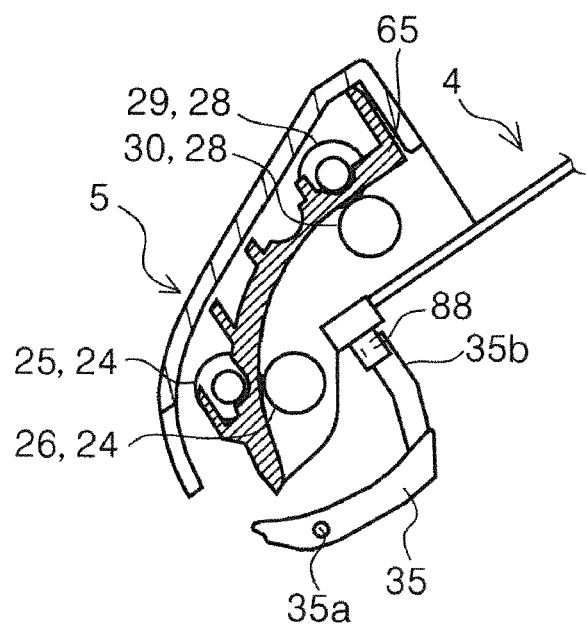

The second posture detection sensor 88 is provided to the second unit 4 as shown in FIGS. 11A and 11B. A detection target portion 35b is formed on the flap 35. When the apparatus body 2 is in the normal reading posture, the detection target portion 35b deviates from the optical axis of the second posture detection sensor 88 as shown in FIG. 11A. When the apparatus body 2 is turned from this state toward the booklet reading posture, the detection target portion 35b blocks the optical axis of the second posture detection sensor 88 as shown in FIG. 11B.

As described above, the controlling portion 80 can detect the posture of the apparatus body 2 based on the detection signal from the first posture detection sensor 87 and the detection signal from the second posture detection sensor 88.

According to the above-described embodiment, the posture of the apparatus body 2 is switched by using the power from the posture switching motor 40. Instead thereof, or in addition thereto, the posture of the apparatus body 2 may be switched by causing the user to apply force to the apparatus body 2.

Figure 13:
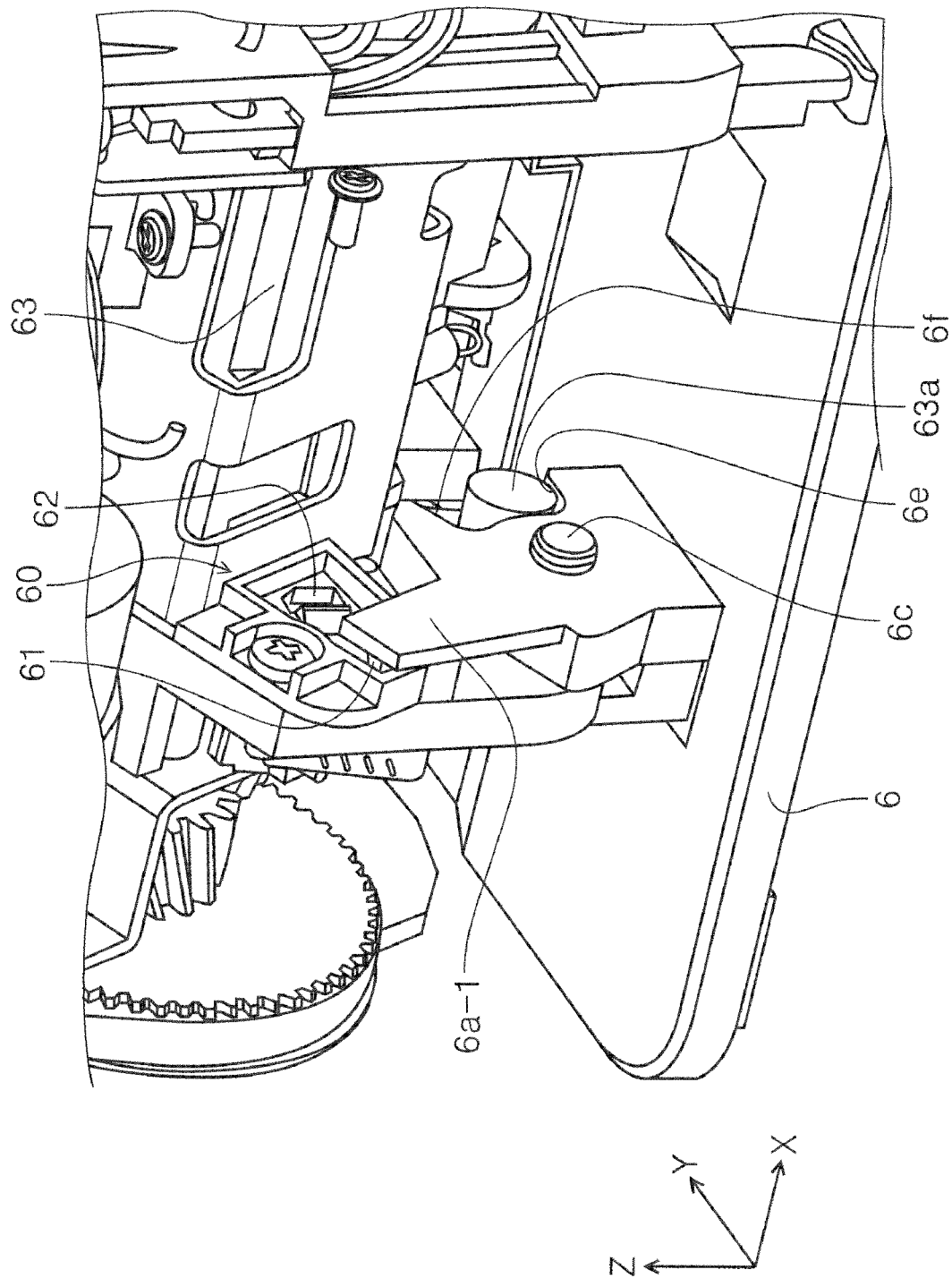
FIG. 13 is a perspective view showing a posture retention unit according to another embodiment.

FIG. 13 shows a configuration to switch the posture of the apparatus body 2 by a user operation, in which reference sign 6a-1 denotes an upright wall portion provided to the body supporting portion 6. The first abutting portion 6e and the second abutting portion 6f are formed on the upright wall portion 6a-1. The boss 63a abuts against the first abutting portion 6e, thereby controlling the normal reading posture of the apparatus body 2. The boss 63a abuts against the second abutting portion 6f, thereby controlling the booklet reading posture of the apparatus body 2.

The upright wall portion 6a-1 is provided with a projection 61. A recessed portion 62 is formed in the first frame 63. The posture of the apparatus body 2 is retained as a consequence of the projection 61 coming into the recessed portion 62. Note that FIG. 13 illustrates the normal reading posture. In FIG. 13, the projection 61 comes into a hidden recessed portion so as to retain the normal reading posture. The not-illustrated recessed portion, the recessed portion 62, and the projection 61 collectively constitute a posture retention unit 60 that retains the posture of the apparatus body 2.

In the configuration to switch the posture of the apparatus body 2 by the user operation, it is also preferable to provide the apparatus body 2 with a handrest portion to allow the user to put the hand on.

Next, a description will be given of a configuration for achieving relative turns of the first unit 3, the second unit 4, and the third unit 5.

As shown in FIG. 16, a second frame 64 constituting a base body of the second unit 4 is integrally provided with the frame rotating shafts 64*a* that project in the X axis direction. Two frame rotating shafts 64*a* are provided at an interval in the X axis direction.

Figure 17:
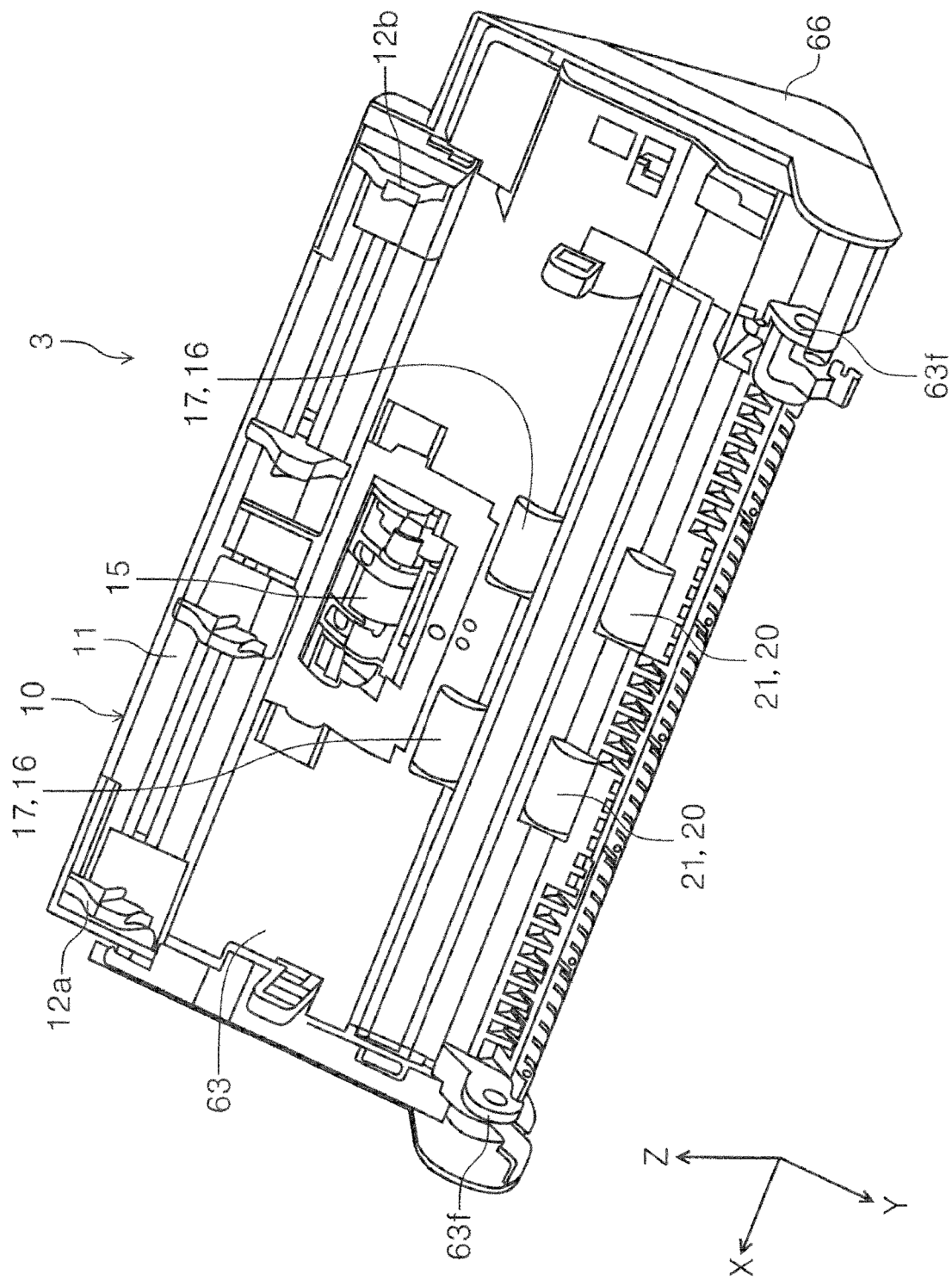
FIG. 17 is a perspective view of the first unit.

As shown in FIG. 17, the first frame 63 constituting the base body of the first unit 3 is integrally provided with bearing portions 63*f*. Two bearing portions 63*f* are provided at an interval in the X axis direction. Engagement of the frame rotating shafts 64*a* of the second frame 64 with the bearing portions 63*f* renders the second frame 64, namely, the second unit 4 turnable relative to the first frame 63, namely, the first unit 3.

As shown in FIG. 18, a third frame 65 constituting a base body of the third unit 5 is integrally provided with bearing portions 65*a*. Two bearing portions 65*a* are provided at an interval in the X axis direction. Engagement of the frame rotating shafts 64*a* of the second frame 64 with the bearing portions 65*a* renders the third frame 65, namely, the third unit 5 turnable relative to the first unit 3 and the second unit 4.

The third unit 5 can be opened and closed by being turned relative to the second unit 4 that is closed relative to the first unit 3, and can be opened and closed by being turned relative to the second unit 4 that is opened relative to the first unit 3.

Here, the third frame 65 is provided with two lock portions 65*b* at an interval in the X axis direction. The third frame 65 is locked with the second frame 64 by elastically engaging the lock portions 65*b* with not-illustrated engaged portions formed on the second frame 64.

Figure 14:
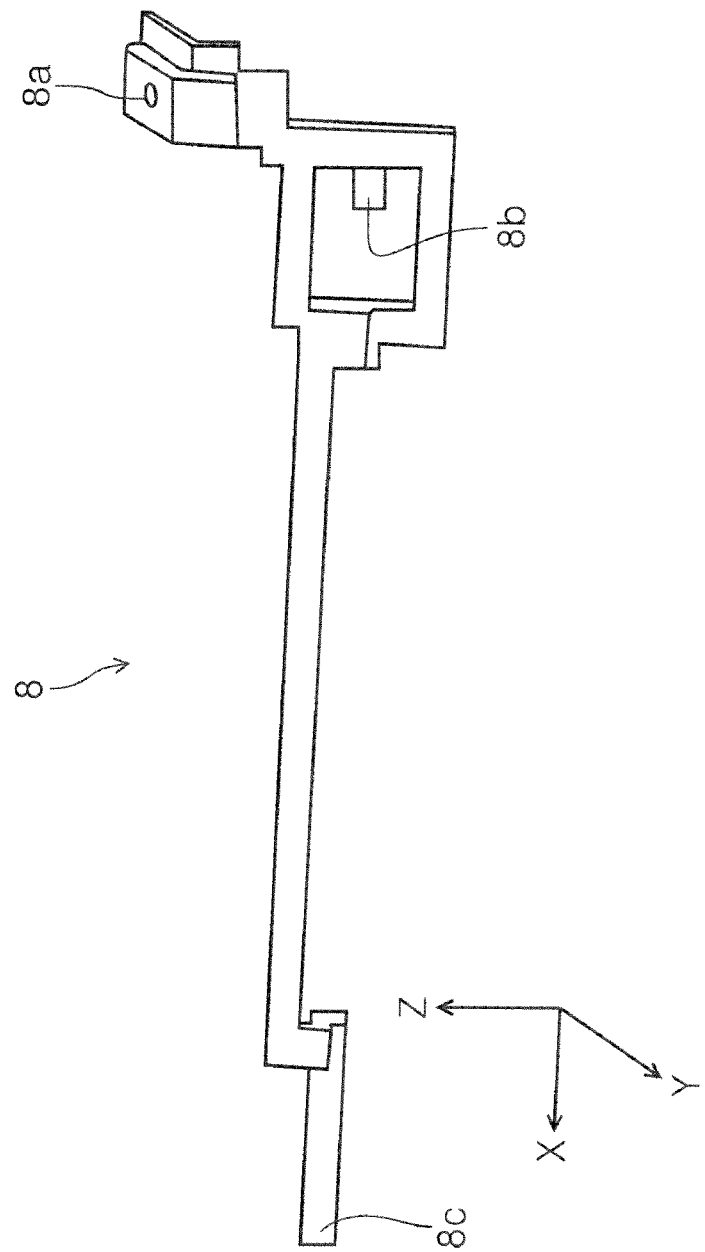
FIG. 14 is a perspective view of a lock member.

A lock member 8 shown in FIG. 14 is provided in such a way as to be slidable in the X axis direction relative to the second frame 64 of the second unit 4. The lock member 8 is pressed in the +X direction by a not-illustrated spring in the second frame 64.

The lock member 8 includes the unlocking portion 8*a*. The unlocking portion 8*a* is exposed to an upper portion of the second unit 4 as shown in FIGS. 1 and 3. The user can unlock the second unit 4 from the first unit 3 by sliding the unlocking portion 8*a* in the −X direction, thereby opening the second unit 4.

Figure 15:
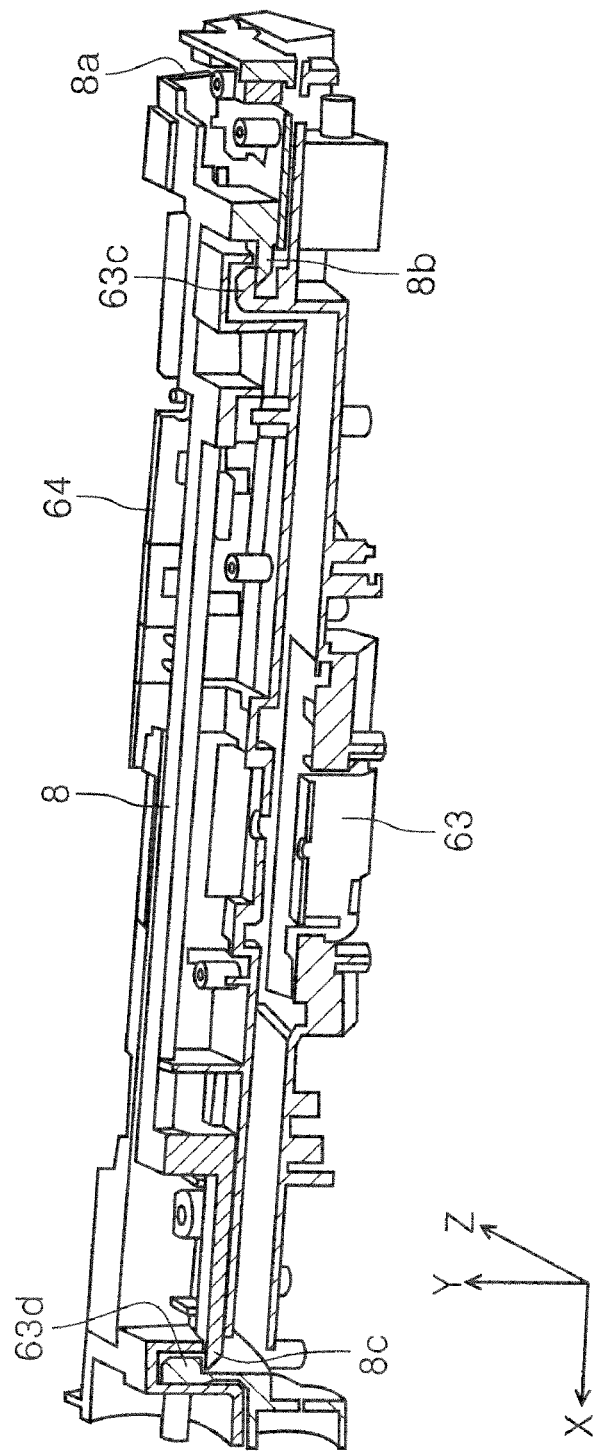
FIG. 15 is a cross-sectional view showing a structure to lock the second unit.

As shown in FIG. 15, a first locking portion 63*c* and a second locking portion 63*d* are formed at an interval in the X axis direction on the first frame 63 constituting the base body of the first unit 3. A first locked portion 8*b* and a second locked portion 8*c* are formed at an interval in the X axis direction on the lock member 8. Moreover, as shown in FIG. 15, the first locked portion 8*b* overlaps the first locking portion 63*c* and the second locked portion 8*c* overlaps the second locking portion 63*d*, whereby the lock member 8, that is, the second unit 4 is locked with the first frame 63, that is, the first unit 3. When the lock member 8 is caused to slide in the −X direction from the state shown in FIG. 15, the overlap of the first locked portion 8*b* and the first locking portion 63*c* is cancelled and the overlap of the second locked portion 8*c* and the second locking portion 63*d* is cancelled as well. In this way, the second unit 4 is unlocked from the first unit 3. Thus, it is possible to open the second unit 4.

Next, a control system in the scanner 1 will be described with reference to FIG. 12.

The controlling portion 80 performs a variety of control of the scanner 1 including feeding, transportation, and discharge control of the originals as well as reading control thereof. Signals are inputted from the operating portion 7 to the controlling portion 80.

The controlling portion 80 controls the transportation motor 50 and the posture switching motor 40. In the present embodiment, each of the motors is a DC motor.

Readout data are inputted from the first reading unit 32 and the second reading unit 33 to the controlling portion 80, and signals for controlling the respective reading units are transmitted from the controlling portion 80 to these reading units.

More signals from detection units including a mounting detecting portion 92, a double feeding detecting portion 91, a first original detecting portion 93, a second original detecting portion 94, the first posture detection sensor 87, the second posture detection sensor 88, a first rotation detecting portion 89, and a second rotation detecting portion 90 are also inputted to the controlling portion 80.

As shown in FIG. 7, the first rotation detecting portion 89 is a detecting portion provided at an end portion in the −X direction of the apparatus body 2. The controlling portion 80 can figure out amounts of rotation of the respective rollers provided to the original transportation path by detecting an amount of rotation of the transportation motor 50 by using the first rotation detecting portion 89.

The first rotation detecting portion 89 is a rotary encoder that includes a rotary disc 89*a* and a detecting portion 89*b*.

As shown in FIG. 8, the second rotation detecting portion 90 is a rotary encoder that includes a rotary disc 90*a* to be provided to a rotating shaft 40*a* of the posture switching motor 40, and a detecting portion 90*b*. The controlling portion 80 can figure out a direction of rotation and an amount of rotation of the posture switching motor 40 by detecting the amount of rotation of the posture switching motor 40 by using the second rotation detecting portion 90.

Back to FIG. 12, the controlling portion 80 includes a CPU 81, a flash ROM 82, and a RAM 83. The CPU 81 carries out a variety of arithmetic processing in accordance with programs stored in the flash ROM 82, thereby controlling operations of the entire scanner 1. The flash ROM 82 representing an example of a storage unit is a readable and writable non-volatile memory. The RAM 83 representing an example of another storage unit temporarily stores a variety of information.

An interface 84 provided to the controlling portion 80 includes the first coupling portion 71 and the second coupling portion 72 described with reference to FIG. 2. The controlling portion 80 transmits and receives data to and from the external device 100 through this interface 84.

Next, a description will be given of the rest of the detecting portions.

The mounting detecting portion 92 is a detecting portion provided upstream of the feed roller 14. The controlling portion 80 can detect the presence or absence of the original on the original supporting portion 11 based on the signal transmitted from the mounting detecting portion 92.

The first original detecting portion 93 is a detecting portion provided between the feed roller 14 and the pair of first transportation rollers 16. The controlling portion 80 can detect passage of a front edge or a rear edge of the original at a position of detection based on the signal transmitted from the first original detecting portion 93.

The double feeding detecting portion 91 is a detecting portion provided between the feed roller 14 and the pair of first transportation rollers 16, which includes an ultrasonic wave transmitter and an ultrasonic wave receiver disposed while interposing the original feeding path R1 in between. The controlling portion 80 can detect double feeding of the originals based on the signal transmitted from the double feeding detecting portion 91.

The second original detecting portion 94 is a detecting portion provided between the pair of first transportation rollers 16 and the first reading unit 32 as well as the second reading unit 33. The controlling portion 80 can detect passage of the front edge or the rear edge of the original at a position of detection based on the signal transmitted from the second original detecting portion 94.

In FIGS. 5 and 6, the positions of detection by the respective detecting portions are indicated with triangle marks and the reference signs of the corresponding detecting portions are attached thereto.

Figure 19:
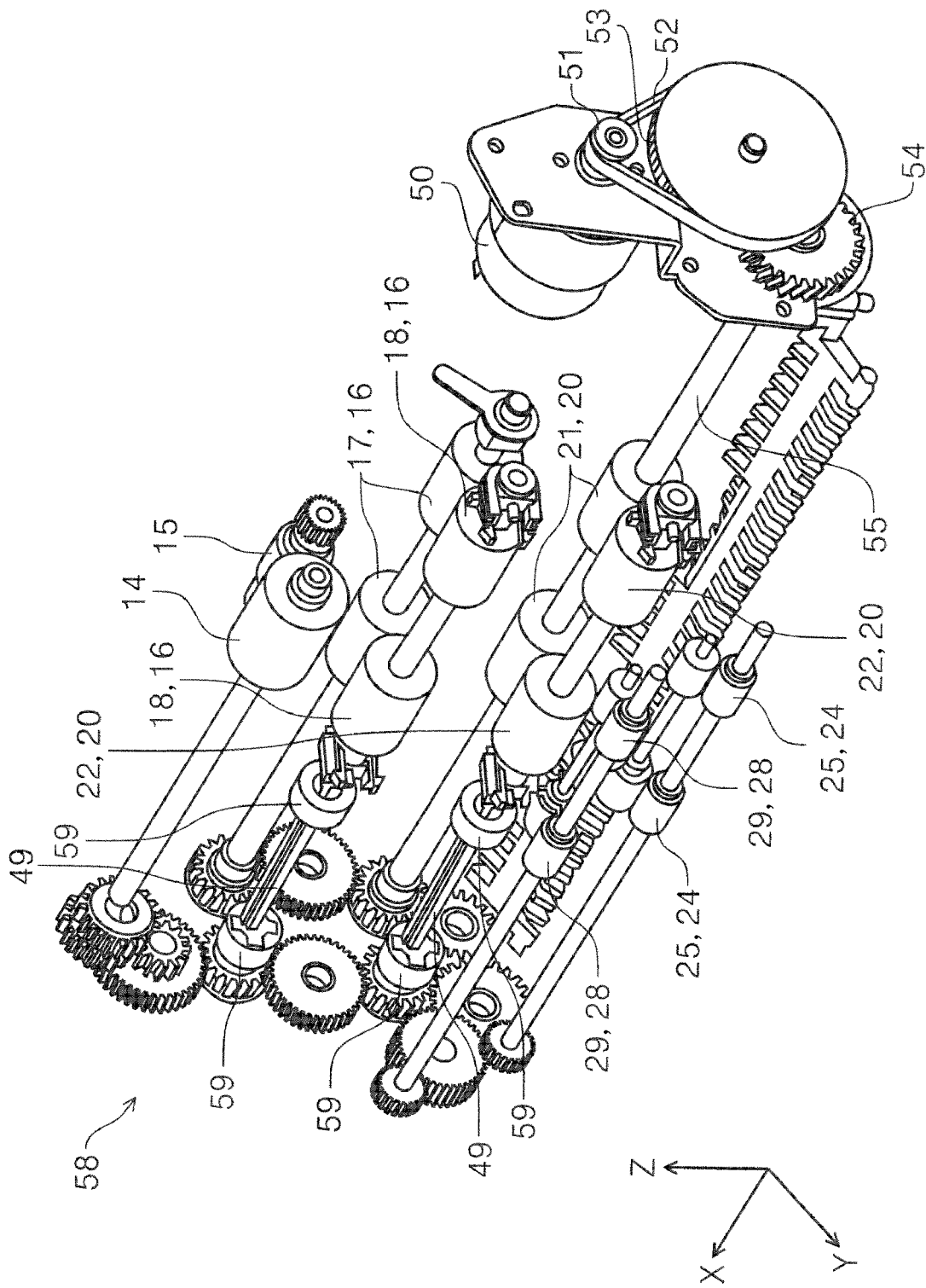
FIG. 19 is a perspective view showing a configuration to transmit driving force from a transportation motor to respective rollers.

Next, a configuration to transmit driving force from the transportation motor 50 to the respective rollers will be described with reference to FIG. 19.

The transportation motor 50 is provided at the end portion in the −X direction of the apparatus body 2. A driving pulley 51 is provided to a rotating shaft of the transportation motor 50, and the driving force is transmitted from the driving pulley 51 to a driven pulley 53 through a belt 52. A not-illustrated gear is integrally formed on the driven pulley 53, and this gear is threadedly engaged with a gear 54. A rotating shaft 55 of the second lower roller 21 is provided with a not-illustrated gear at an end portion in the −X direction, and this gear is threadedly engaged with the gear 54, thereby driving the rotating shaft 55.

A gear train 58 is provided at an end portion in the +X direction of the rotating shaft 55. The gear train 58 is rotated by receiving power from the rotating shaft 55, thus transmitting the driving force to rotating shafts of the respective rollers.

Although detailed explanations of the gear train 58 will be omitted hereinbelow, each of a driving force transmission route to the first upper roller 18 and a driving force transmission route to the second upper roller 22 is provided with universal joints 59 unlike driving force transmission routes to the remaining rollers. The universal joints are provided on two sides of a transmission shaft 49. Accordingly, the first upper roller 18 and the second upper roller 22 can be driven by the transportation motor 50 while being displaced relative to the opposed rollers.

Regarding a reduction ratio when transmitting the power from the transportation motor 50 to the respective rollers in the present embodiment, a reduction ratio of the power transmission from the transportation motor 50 to the pair of second transportation rollers 20 is 1 on the assumption that a reduction ratio of the power transmission from the transportation motor 50 to the pair of first transportation rollers 16 is set to 1. In other words, these reduction ratios are equal.

Here, an outside roller diameter of the first lower roller 17 is equal to an outside roller diameter of the first upper roller 18, and an outside roller diameter of the second lower roller 21 is equal to an outside roller diameter of the second upper roller 22. The outside roller diameters of the second lower roller 21 and the second upper roller 22 are slightly larger than the outside roller diameters of the first lower roller 17 and the first upper roller 18. As a consequence, an original transportation velocity by the pair of second transportation rollers 20 is higher than an original transportation velocity by the pair of first transportation rollers 16.

In the present embodiment, a reduction ratio from the transportation motor 50 to the third driving roller 25 is less than 1 on the assumption that the reduction ratio of the power transmission from the transportation motor 50 to the pair of first transportation rollers 16 is set to 1. Likewise, a reduction ratio from the transportation motor 50 to the fourth driving roller 29 is less than 1. In the present embodiment, the reduction ratio of the power transmission from the transportation motor 50 to the third driving roller 25 is equal to the reduction ratio of the power transmission from the transportation motor 50 to the fourth driving roller 29.

Here, an outside diameter of the fourth driving roller 29 is slightly larger than an outside diameter of the third driving roller 25. Accordingly, an original transportation velocity by the pair of fourth transportation rollers 28 is higher than an original transportation velocity by the pair of third transportation rollers 24.

The outside diameter of the third driving roller 25 is set such that the original transportation velocity by the pair of third transportation rollers 24 is higher than the original transportation velocity by the pair of second transportation rollers 20.

As a consequence, the original transportation velocity is higher in the order of the pair of first transportation rollers 16, the pair of second transportation rollers 20, the pair of third transportation rollers 24, and the pair of fourth transportation rollers 28. In other words, the original transportation velocity becomes gradually higher toward the downstream.

The above-described configuration as well as operations and effects of the scanner 1 will be summarized as follows. Specifically, the scanner 1 includes the body supporting portion 6 mounted on the mounting surface G of the apparatus, and the apparatus body 2 supported by the body supporting portion 6. The apparatus body 2 includes the reading transportation path R2 which is original transportation path used to transport the original and in which the first reading unit 32 and the second reading unit 33 for reading the original are opposed to each other, the reverse transportation path R3 being the original transportation path located downstream of the reading transportation path R2, and used when the original subjected to reading is reversed upward and discharged, and the non-reverse transportation path R4 being the original transportation located downstream of the reading transportation path R2, and used when the original subjected to reading is discharged without reversing the original. The apparatus body 2 includes the flap 35 that switches the original transportation path to be coupled to the reading transportation path R2 to any of the reverse transportation path R3 and the non-reverse transportation path R4.

The apparatus body 2 is turnably provided to the body supporting portion 6, so that the apparatus body 2 can be turned so as to switch between the normal reading posture (FIG. 5) and the booklet reading posture (FIG. 6) in which the angle formed between the reading transportation path R2 and the mounting surface G is smaller than the corresponding angle in the normal reading posture. The flap 35 couples the reading transportation path R2 to the reverse transportation path R3 when the apparatus body 2 takes the normal reading posture, and couples the reading transportation path R2 to the non-reverse transportation path R4 when the apparatus body 2 takes the booklet reading posture.

The scanner 1 can favorably transport a less flexible original by using the non-reverse transportation path R4. Examples of such a less flexible original include a booklet and a card. Moreover, the flap 35 couples the reading transportation path R2 to the reverse transportation path R3 when the apparatus body 2 takes the normal reading posture, and couples the reading transportation path R2 to the non-reverse transportation path R4 when the apparatus body 2 takes the booklet reading posture. In this way, a direction to discharge the original can be set to the direction along the mounting surface G as compared to the case of discharging the original by using the non-reverse transportation path R4 when taking the normal reading posture. As a consequence, it is possible to discharge the original that is larger in size as compared to the mode of discharging the original by using the non-reverse transportation path R4 when taking the normal reading posture.

By setting the apparatus body 2 to the normal reading posture, it is possible to increase the angle formed between the reading transportation path R2 and the mounting surface G as compared to that in the booklet reading posture, thereby reducing the footprint of the apparatus body 2.

The apparatus body 2 includes the pair of second transportation rollers 20 functioning as the pair of discharge rollers that discharge the original from the non-reverse transportation path R4, and a common tangent L to the pair of second transportation rollers 20 in a side view of the original transportation path intersects with the body supporting portion 6 in the normal reading posture (see FIG. 5) and does not intersect with the body supporting portion 6 in the booklet reading posture (see FIG. 6).

Accordingly, the original to be discharged when discharging the original by using the non-reverse transportation path R4 is less likely to come into contact with the body supporting portion 6. Thus, it is possible to appropriately discharge the original that is large in size.

Note that the above-described configuration can also be regarded as a configuration in which a virtual line obtained by extending the reading transportation path R2 in the side view of the original transportation path intersects with the body supporting portion 6 in the normal reading posture and does not intersect with the body supporting portion 6 in the booklet reading posture.

The above-described configuration can also be regarded as a configuration in which an extended line of a straight line linking the nipping position of the pair of first transportation rollers 16 to the nipping position of the pair of second transportation rollers 20 in the side view of the original transportation path intersects with the body supporting portion 6 in the normal reading posture and does not intersect with the body supporting portion 6 in the booklet reading posture.

The above-described configuration can also be regarded as a configuration in which a line obtained by extending either a glass surface of a contact glass member 32a constituting the first reading unit 32 or a glass surface of a contact glass member 33a constituting the second reading unit 33 obliquely downward in the side view of the original transportation path intersects with the body supporting portion 6 in the normal reading posture and does not intersect with the body supporting portion 6 in the booklet reading posture.

The second discharge port 38 that defines a discharge position to discharge the original by using the non-reverse transportation path R4 is higher in terms of the vertical direction when the apparatus body 2 takes the booklet reading posture than when the apparatus body 2 takes the normal reading posture. This is apparent from the second discharge port 38 shown in FIG. 5 and the second discharge port 38 shown in FIG. 6.

Accordingly, the original to be discharged when discharging the original by using the non-reverse transportation path R4 is less likely to come into contact with the body supporting portion 6 or the mounting surface G. Thus, it is possible to appropriately discharge the original that is large in size.

In the present embodiment, the first discharge port 37 that defines the discharge position to discharge the original by using the reverse transportation path R3 is higher when the apparatus body 2 takes the booklet reading posture than when the apparatus body 2 takes the normal reading posture.

In the present embodiment, the feed port 13 is higher when the apparatus body 2 takes the normal reading posture than when the apparatus body 2 takes the booklet reading posture.

In the present embodiment, a position of the center of a rotating shaft of the feed roller 14 is higher when the apparatus body 2 takes the booklet reading posture than when the apparatus body 2 takes the normal reading posture.

In the present embodiment, a position of the center of a rotating shaft of the fourth driving roller 29 is higher when the apparatus body 2 takes the booklet reading posture than when the apparatus body 2 takes the normal reading posture.

The transportation path switching unit includes the flap 35 being the posture-switchable flap member, and is configured to switch the original transportation path to be coupled to the reading transportation path R2 to any of the reverse transportation path R3 and the non-reverse transportation path R4 by posture switching of the flap 35. The flap 35 switches the posture in conjunction with posture switching of the apparatus body 2. The above-described configuration can construct the transportation path switching unit with a simple structure.

The scanner 1 includes the posture switching motor 40 serving as a power source for turning the apparatus body 2, and the rotation transforming unit 41 that transforms the rotation of the posture switching motor 40 into the turn of the apparatus body 2. Accordingly, the user is not required to directly turn the apparatus body 2, and the usability of the user is thus improved.

The posture switching motor 40 is provided to the apparatus body 2. The rotation transforming unit 41 includes the gear 47b rotatably provided to the apparatus body 2 and configured to be rotated by the power from the posture switching motor 40, and the thread portion 6b fixed to the body supporting portion 6 and threadedly engaged with the gear 47b. Accordingly, it is possible to construct the rotation transforming unit 41 with a simple structure.

The scanner 1 includes the first posture detection sensor 87 and the second posture detection sensor 88 each serving as a posture detection unit for detecting the posture of the apparatus body 2. The controlling portion 80 that controls the posture switching motor 40 controls the posture of the apparatus body 2 based on detection information from the posture detection unit. Accordingly, it is possible to keep the apparatus body 2 from taking a halfway posture, that is, a posture which is neither the normal reading posture nor the booklet reading posture.

The scanner 1 includes the second rotation detecting portion 90, which is an encoder sensor that detects the amount of rotation and the direction of rotation of the posture switching motor 40. Accordingly, the posture switching motor 40 can be controlled more appropriately.

The scanner 1 includes the first abutting portion 6e serving as the first turn control unit to control a turn limit when the apparatus body 2 is turned from the booklet reading posture to the normal reading posture, and the second abutting portion 6f serving as the second turn control unit to control a turn limit when the apparatus body 2 is turned from the normal reading posture to the booklet reading posture. Then, the normal reading posture of the apparatus body 2 is controlled by the first abutting portion 6e while the booklet reading posture of the apparatus body 2 is controlled by the second abutting portion 6f. Accordingly, it is possible to accurately control the normal reading posture and the booklet reading posture of the apparatus body 2.

The pair of first transportation rollers 16 provided to the reading transportation path R2 include the first lower roller 17 that comes into contact with the first surface being the lower surface of the original transported on the reading transportation path R2, and the first upper roller 18 that comes into contact with the second surface being the upper surface of the original transported on the reading transportation path R2. The pair of second transportation rollers 20 include the second lower roller 21 that comes into contact with the first surface of the original, and the second upper roller 22 that comes into contact with the second surface of the original. Then, the first lower roller 17, the first upper roller 18, the second lower roller 21, and the second upper roller 22 are rotationally driven by the transportation motor 50 serving as a driving source. Accordingly, it is possible to reliably transport the original having a large thickness.

The first upper roller 18 is provided in such a way as to be capable of approaching and receding from the first lower roller 17, and the second upper roller 22 is provided in such a way as to be capable of approaching and receding from the second lower roller 21. Here, the power is transmitted from the transportation motor 50 to the first upper roller 18 and the second upper roller 22 by using the universal joints 59. Accordingly, it is possible to appropriately transmit the power from the transportation motor 50 to the movable first upper roller 18 and the movable second upper roller 22.

The apparatus body 2 includes the first unit 3 provided with the first lower roller 17 and the second lower roller 21, and the second unit 4 being the unit provided with the first upper roller 18 and the second upper roller 22, and openable and closable relative to the first unit 3. Accordingly, the nipping by the pair of first transportation rollers 16 and the pair of second transportation rollers 20 is released by opening the second unit 4, so that the original can be easily removed when the original is jammed.

The scanner 1 includes the pair of third transportation rollers 24 being the pair of rollers provided to the reverse transportation path R3 and located downstream of the pair of second transportation rollers 20, and the pair of fourth transportation rollers 28 being the pair of rollers provided to the reverse transportation path R3 and located downstream of the pair of third transportation rollers 24.

The pair of third transportation rollers 24 include the third driving roller 25 configured to come into contact with the first surface of the original and subjected to driving, and the third driven roller 26 configured to come into contact with the second surface of the original and to be rotationally driven in contact with the original. The pair of fourth transportation rollers 28 include the fourth driving roller 29 configured to come into contact with the first surface of the original and subjected to driving, and the fourth driven roller 30 configured come into contact with the second surface of the original and to be rotationally driven in contact with the original. The second unit 4 includes the third driven roller 26 and the fourth driven roller 30. The apparatus body 2 includes the third unit 5, which is the unit provided with the third driving roller 25 and the fourth driving roller 29 and rendered openable and closable relative to the second unit 4.

Accordingly, the nipping by the pair of third transportation rollers 24 and the pair of fourth transportation rollers 28 is released by opening the third unit, so that the original can be easily removed when the original is jammed.

The separation roller 15 can switch between the state of separation to separate the original and the state of non-separation not to separate the original. The separation roller 15 establishes the state of separation when the apparatus body 2 is in the normal reading posture and establishes the state of non-separation when the apparatus body 2 is in the booklet reading posture. Accordingly, when feeding the booklet representing an example of the original having high rigidity, it is possible to feed the booklet appropriately.

Figure 20:
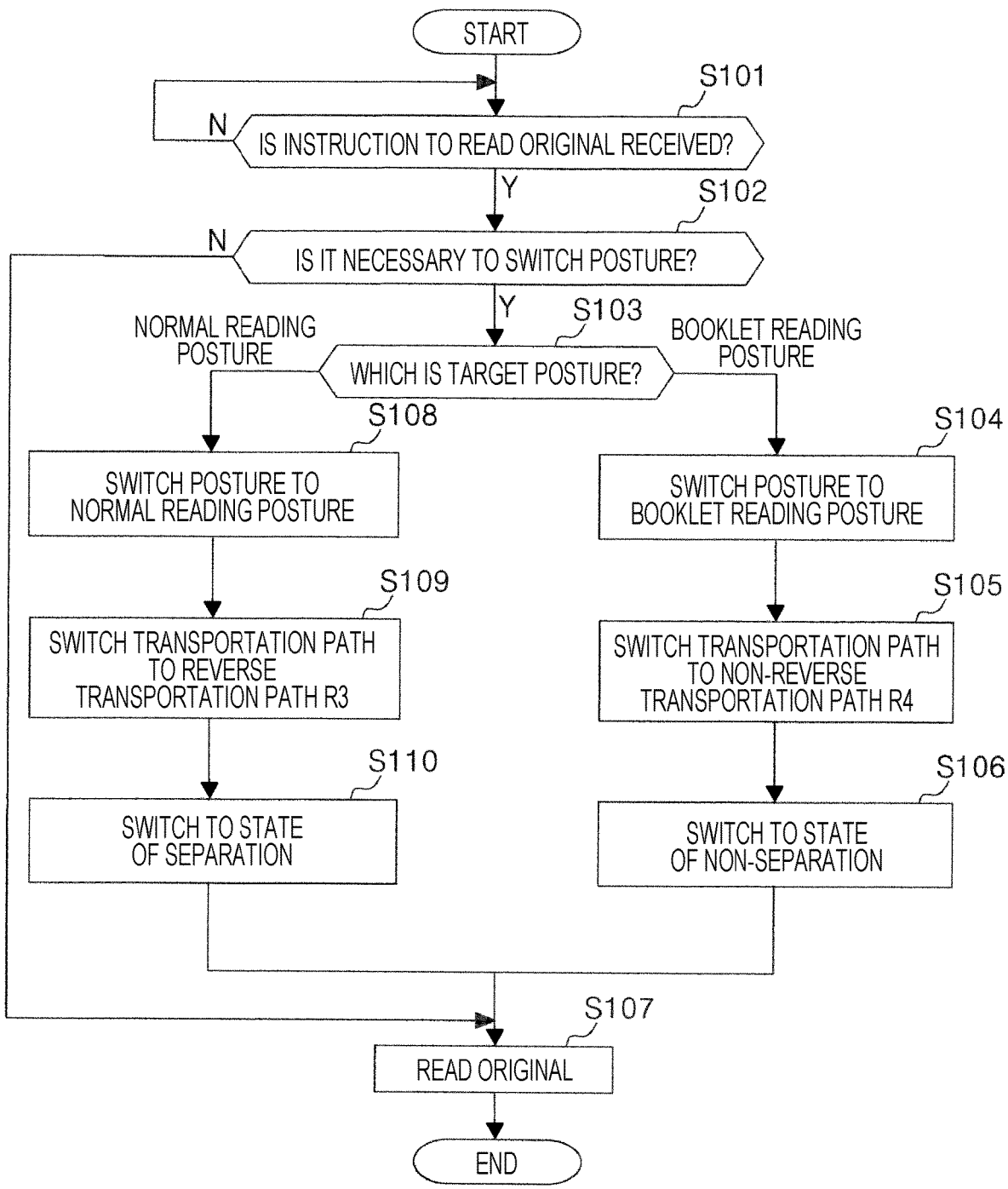
FIG. 20 is a flowchart showing control when switching the posture of the apparatus body.

FIG. 20 is a flowchart showing processing by the controlling portion 80 when switching the posture of the apparatus body 2. In FIG. 20, when the controlling portion 80 receives an instruction to read the original (yes in step S101), the controlling portion 80 determines whether or not it is necessary to switch the posture of the apparatus body 2 (step S102). Here, the instruction to read the original is received from the external device 100 (see FIG. 12), for example. The external device 100 can set the type of the original to be read, and the controlling portion 80 sets the posture of the apparatus body 2 to the booklet reading posture when the original to be read is the original in the form of a card or the original in the form of a booklet, or sets the posture of the apparatus body 2 to the normal reading posture when the original to be read is the original in the form of a sheet.

In step S102, the appropriateness to switch the posture of the apparatus body 2 is determined by comparing the obtained original type with the current posture of the apparatus body 2. As a consequence, when it is not necessary to switch the posture (No in step S102), the original is subjected to reading without carrying out the posture switching control (step S107). When it is necessary to switch the posture (Yes in step S102), the controlling portion 80 checks a target posture (step S103). When the target posture is the booklet reading posture, the controlling portion 80 switches the posture of the apparatus body 2 to the booklet reading posture (step S104), switches the original transportation path to the non-reverse transportation path R4 (step S105), and switches the state of the separation roller 15 to the state of non-separation (step S106). Here, the steps S104, S105, and S106 may be executed at the same time. Then, the original is subjected to reading (step S107).

The controlling portion 80 checks the target posture (step S103). When the target posture is the normal reading posture, the controlling portion 80 switches the posture of the apparatus body 2 to the normal reading posture (step S108), switches the original transportation path to the reverse transportation path R3 (step S109), and switches the state of the separation roller 15 to the state of separation (step S110). Here, the steps S108, S109, and S110 may be executed at the same time. Then, the original is subjected to reading (step S107).

Here, it is also preferable to activate the detection information from the double feeding detecting portion 91 when the apparatus body 2 is in the normal reading posture, and to inactivate the detection information from the double feeding detecting portion 91 when the apparatus body 2 is in the booklet reading posture.

The posture of the apparatus body 2 may be switched by using a button constituting the operating portion 7. For example, one of the buttons constituting the operating portion 7 is allocated to a posture switching button. When the user presses the posture switching button in the state where the current posture is set to the normal reading posture, the controlling portion 80 executes the steps S104 and S105. On the other hand, when the user presses the posture switching button in the state where the current posture is set to the booklet reading posture, the controlling portion 80 executes the steps S107 and S108 by controlling the posture switching motor 40.

The posture of the apparatus body 2 may naturally be switched by application of the force from the user to the apparatus body 2 as mentioned earlier. In this case, the controlling portion 80 executes the steps S105 and S106 when the controlling portion 80 detects that the posture of the apparatus body 2 is switched from the normal reading posture to the booklet reading posture. The controlling portion 80 executes the steps S109 and S110 when the controlling portion 80 detects that the posture of the apparatus body 2 is switched from the booklet reading posture to the normal reading posture.

The present disclosure is not limited only to the above-described embodiment, and various changes are possible within the scope of the present disclosure as defined in the appended claims. It is needless to say that those changes are also encompassed by the scope of the present disclosure.

What is claimed is:

1. An image reading apparatus comprising:
    a body supporting portion mounted on a mounting surface of the apparatus; and
    an apparatus body supported and configured to turn by the body supporting portion, wherein
    the apparatus body includes
        a reading transportation path opposed to a reading unit that reads an original,
        a reverse transportation path located downstream of the reading transportation path, and used when the original subjected to reading is reversed upward and discharged,
        a non-reverse transportation path located downstream of the reading transportation path, and configured to discharge the original subjected to reading without reversing the original, and
        a transportation path switching unit located downstream of the reading transportation path and configured to switch an original transportation path used to transport the original to any of the reverse transportation path and the non-reverse transportation path,
    the apparatus body is configured to be turned relative to the body supporting portion so as to switch between a first posture and a second posture, the second posture forming an angle between the reading transportation path and the mounting surface being smaller than an angle between the reading transportation path and the mounting surface formed in the first posture, and
    the transportation path switching unit switches the original transportation path to the reverse transportation path when the apparatus body is switched to the first posture, and switches the original transportation path to the non-reverse transportation path when the apparatus body is switched to the second posture.

2. The image reading apparatus according to claim 1, wherein
    the apparatus body includes a pair of discharge rollers that discharge the original from the non-reverse transportation path, and
    a common tangent to the pair of discharge rollers in a side view of the original transportation path intersects with the body supporting portion in the first posture and does not intersect with the body supporting portion in the second posture.

3. The image reading apparatus according to claim 1, wherein
    a discharge position to discharge the original by using the non-reverse transportation path is higher in terms of a vertical direction when the apparatus body takes the second posture than when the apparatus body takes the first posture.

4. The image reading apparatus according to claim 1, wherein
    the transportation path switching unit includes a flap member configured to switch the posture, and is configured to switch the original transportation path to any of the reverse transportation path and the non-reverse transportation path by posture switching of the flap member, and
    a posture of the flap member is switched in conjunction with posture switching of the apparatus body.

5. The image reading apparatus according to claim 1, further comprising:
    a motor serving as a power source to turn the apparatus body; and
    a rotation transforming unit that transforms rotation of the motor into a turn of the apparatus body.

6. The image reading apparatus according to claim 5, wherein
    the motor is provided to the apparatus body, and
    the rotation transforming unit includes
        a gear rotatably provided to the apparatus body and configured to be rotated by power from the motor, and
        a thread portion fixed to the body supporting portion and threadedly engaged with the gear.

7. The image reading apparatus according to claim 5, further comprising:
    a posture detection unit configured to detect the posture of the apparatus body, wherein
    a controlling portion that controls the motor controls, based on detection information from the posture detection unit, the posture of the apparatus body.

8. The image reading apparatus according to claim 7, further comprising:
    an encoder sensor that detects an amount of rotation and a direction of rotation of the motor.

9. The image reading apparatus according to claim 1, further comprising:
    a first turn control unit that controls a turn limit when the apparatus body is turned from the second posture to the first posture; and
    a second turn control unit that controls a turn limit when the apparatus body is turned from the first posture to the second posture, wherein
    the first posture of the apparatus body is controlled by the first turn control unit, and
    the second posture of the apparatus body is controlled by the second turn control unit.

10. The image reading apparatus according to claim 1, further comprising:
    a pair of first transportation rollers provided to the reading transportation path and located upstream of the reading unit; and
    a pair of second transportation rollers provided to the reading transportation path and located downstream of the reading unit, wherein
    the pair of first transportation rollers include
        a first lower roller that comes into contact with a lower surface of the original transported on the reading transportation path, and a first upper roller that comes into contact with an upper surface of the original transported on the reading transportation path, the pair of second transportation rollers include a second lower roller that comes into contact with the lower surface of the original, and a second upper roller that comes into contact with the upper surface of the original, and the first lower roller, the first upper roller, the second lower roller, and the second upper roller are rotationally driven by a driving source.

11. The image reading apparatus according to claim 10, wherein the first upper roller is provided and configured to approach and recede from the first lower roller, the second upper roller is provided and configured to approach and recede from the second lower roller, and power is transmitted from the driving source to the first upper roller and the second upper roller by using a universal joint.

12. The image reading apparatus according to claim 10, wherein the apparatus body includes a first unit provided with the first lower roller and the second lower roller, and a second unit provided with the first upper roller and the second upper roller, and configured to be opened and closed relative to the first unit.

13. The image reading apparatus according to claim 12, further comprising:

a pair of third transportation rollers provided to the reverse transportation path and located downstream of the pair of second transportation rollers; and a pair of fourth transportation rollers provided to the reverse transportation path and located downstream of the pair of third transportation rollers, wherein the pair of third transportation rollers include a third driving roller configured to come into contact with the lower surface of the original and subjected to driving, and a third driven roller configured to come into contact with the upper surface of the original and to be rotationally driven in contact with the original, the pair of fourth transportation rollers include a fourth driving roller configured to come into contact with the lower surface of the original and subjected to driving, and a fourth driven roller configured to come into contact with the upper surface of the original and to be rotationally driven in contact with the original, the second unit includes the third driven roller and the fourth driven roller, and the apparatus body includes a third unit provided with the third driving roller and the fourth driving roller, and configured to be opened and closed relative to the second unit.

* * * * *